US012804221B2

(12) United States Patent
Zhen

(10) Patent No.: US 12,804,221 B2
(45) Date of Patent: Nov. 17, 2026

(54) LIVE STREAMING PICTURE DATA PROCESSING METHOD AND APPARATUS, DEVICE, STORAGE MEDIUM, AND PROGRAM

(71) Applicant: Tencent Technology (Shenzhen) Company Limited, Shenzhen (CN)

(72) Inventor: Zhiliang Zhen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 219 days.

(21) Appl. No.: 18/772,684

(22) Filed: Jul. 15, 2024

(65) Prior Publication Data

US 2024/0373085 A1 Nov. 7, 2024

Related U.S. Application Data

(63) Continuation of application No. PCT/CN2023/088924, filed on Apr. 18, 2023.

(30) Foreign Application Priority Data

May 6, 2022 (CN) ......................... 202210486106.1

(51) Int. Cl.
*H04N 21/431* (2011.01)
*H04N 21/2187* (2011.01)
*H04N 21/472* (2011.01)

(52) U.S. Cl.
CPC ..... *H04N 21/4312* (2013.01); *H04N 21/2187* (2013.01); *H04N 21/472* (2013.01)

(58) Field of Classification Search
CPC ........... H04N 21/4312; H04N 21/2187; H04N 21/472
See application file for complete search history.

(56) References Cited

U.S. PATENT DOCUMENTS 12,407,899 B2 * 9/2025 Li .................... H04N 21/44222
2018/0160054 A1 6/2018 Gandhi et al.
2022/0080314 A1 * 3/2022 Zhang ................ A63F 13/2145

FOREIGN PATENT DOCUMENTS

CN 105872705 A 8/2016
CN 113633963 A 11/2021
(Continued)

OTHER PUBLICATIONS

Aug. 4, 2023—(WO) Search Report—App PCT/CN2023/088924.
Apr. 17, 2026—First Office Action—CN Application No. 202210486106.1.

*Primary Examiner* — Joshua D Taylor
(74) *Attorney, Agent, or Firm* — Banner & Witcoff, Ltd.

(57) ABSTRACT

A live streaming picture data processing method and apparatus, a device, a storage medium, and a program are provided. A live streaming interface of a virtual scene may be displayed, where the virtual scene corresponds to live streaming picture from n perspectives. The system may display a live streaming picture from a first perspective and a split-screen control in the interface based on obtained picture data of the first perspective, and, in response to receiving a trigger operation on the split-screen control, split-screen display on live streaming pictures from the m perspectives in the live streaming interface based on obtained live streaming picture data of the m perspectives of the n perspectives, 2≤m≤n, and m being an integer. Accordingly, data processing efficiency can be improved, and a user operation can be simplified, thereby improving human-computer interaction efficiency and reducing running load of a server.

19 Claims, 9 Drawing Sheets

(56) References Cited

FOREIGN PATENT DOCUMENTS

| | | | | | |
|---|---|---|---|---|---|
| CN | 113633973 | A | | 11/2021 | |
| CN | 113794892 | A | | 12/2021 | |
| CN | 114191823 | A | * | 3/2022 | ......... H04N 21/2187 |
| CN | 114339368 | A | | 4/2022 | |
| CN | 118356643 | A | | 7/2024 | |
| JP | 2001-344474 | A | | 12/2001 | |
| JP | 2004-334850 | A | | 11/2004 | |
| WO | 2013108314 | A1 | | 7/2013 | |

* cited by examiner

LIVE STREAMING PICTURE DATA PROCESSING METHOD AND APPARATUS, DEVICE, STORAGE MEDIUM, AND PROGRAM

RELATED APPLICATION

This application is a continuation of PCT Application No. PCT/CN2023/088294, filed Apr. 18, 2023, which claims priority to Chinese Patent Application No. 202210486106.1, filed on May 6, 2022 and entitled "LIVE STREAMING PICTURE DISPLAY METHOD AND APPARATUS, DEVICE, STORAGE MEDIUM, AND PROGRAM PRODUCT". These applications are incorporated herein by reference in their entirety.

FIELD OF THE TECHNOLOGY

This application relates to the field of virtual scene technologies, and in particular, to a live streaming picture data processing method and apparatus, a device, a storage medium, and a program.

BACKGROUND

With continuous development of game technologies, during a multiplayer online game, a user may watch live streaming pictures of other players, such as other players playing a game.

In the related art, when a live streaming application or a game application provides a game live streaming service, a plurality of different game perspectives may be provided for the user to select. Correspondingly, after the user manually selects a perspective, the live streaming application or the game application switches to the perspective selected by the user to display a live streaming picture.

BRIEF SUMMARY

Aspects described herein provide a live streaming picture data processing method and apparatus, a device, a storage medium, and a program, which can reduce operations by a user when watching live streaming pictures from different perspectives, improve human-computer interaction efficiency, and reduce running load of a server. The technical solutions include the following:

According to one aspect, a live streaming picture data processing method, performed by a computer device, may include:

displaying a live streaming interface of a virtual scene, the virtual scene corresponding to live streaming pictures from n perspectives; and n being greater than or equal to 2, and n being an integer;

obtaining live streaming picture data of a first perspective, and displaying a live streaming picture from the first perspective and a split-screen control in the live streaming interface based on the live streaming picture data of the first perspective, the first perspective being one of the n perspectives; and obtaining live streaming picture data of m perspectives of the n perspectives in response to receiving a trigger operation on the split-screen control, and performing split-screen display on live streaming pictures from the m perspectives in the live streaming interface based on the live streaming picture data of the m perspectives, 2≤m≤n, and m being an integer.

According to another aspect, a live streaming picture data processing apparatus may include:

a live streaming interface display module, configured to display a live streaming interface of a virtual scene, the virtual scene corresponding to live streaming pictures from n perspectives; and n being greater than or equal to 2, and n being an integer;

a picture display module, configured to obtain live streaming picture data of a first perspective, and display a live streaming picture from the first perspective and a split-screen control in the live streaming interface based on the live streaming picture data of the first perspective, the first perspective being one of the n perspectives; and a split-screen display module, configured to obtain live streaming picture data of m perspectives of the n perspectives in response to receiving a trigger operation on the split-screen control, and perform split-screen display on live streaming pictures from the m perspectives in a live streaming interface based on the live streaming picture data of the m perspectives, 2≤m≤n, and m being an integer.

According to another aspect a computer device may include a processor and a memory, the memory having at least one computer instruction stored therein, and the at least one computer instruction being loaded and executed by the processor, to enable the computer device to implement a live streaming picture data processing method according to one or more aspects described herein.

According to another aspect, a non-volatile computer-readable storage medium may be provided, the computer-readable storage medium having at least one computer instruction stored therein, and the at least one computer instruction being loaded and executed by a processor, to enable a computer device to implement a live streaming picture data processing method according to one or more aspects described herein.

According to another aspect, a computer program product or a computer program is provided, including computer instructions, and the computer instructions being stored in a non-volatile computer-readable storage medium. A processor of a computer device reads the computer instructions from the non-volatile computer-readable storage medium, and the processor executes the computer instructions, to enable the computer device to perform a live streaming picture data processing method provided in various optional implementations of one or more aspects described herein.

For a virtual scene that supports live streaming pictures or images from a plurality of perspectives, when a terminal displays a live streaming picture/image from one of the plurality of perspectives in a live streaming interface based on obtained live streaming picture data of the perspective, a user may trigger a split-screen control in the live streaming interface, so that the terminal obtains live streaming picture data of two or more perspectives, and simultaneously displays live streaming pictures from the two or more perspectives in a split-screen manner in the live streaming interface. This can reduce user operations, improve data processing efficiency, and simplify the user operation when the user simultaneously focuses on the plurality of perspectives, thereby improving human-computer interaction efficiency and reducing running load of a server.

DETAILED DESCRIPTION

Figure 1:
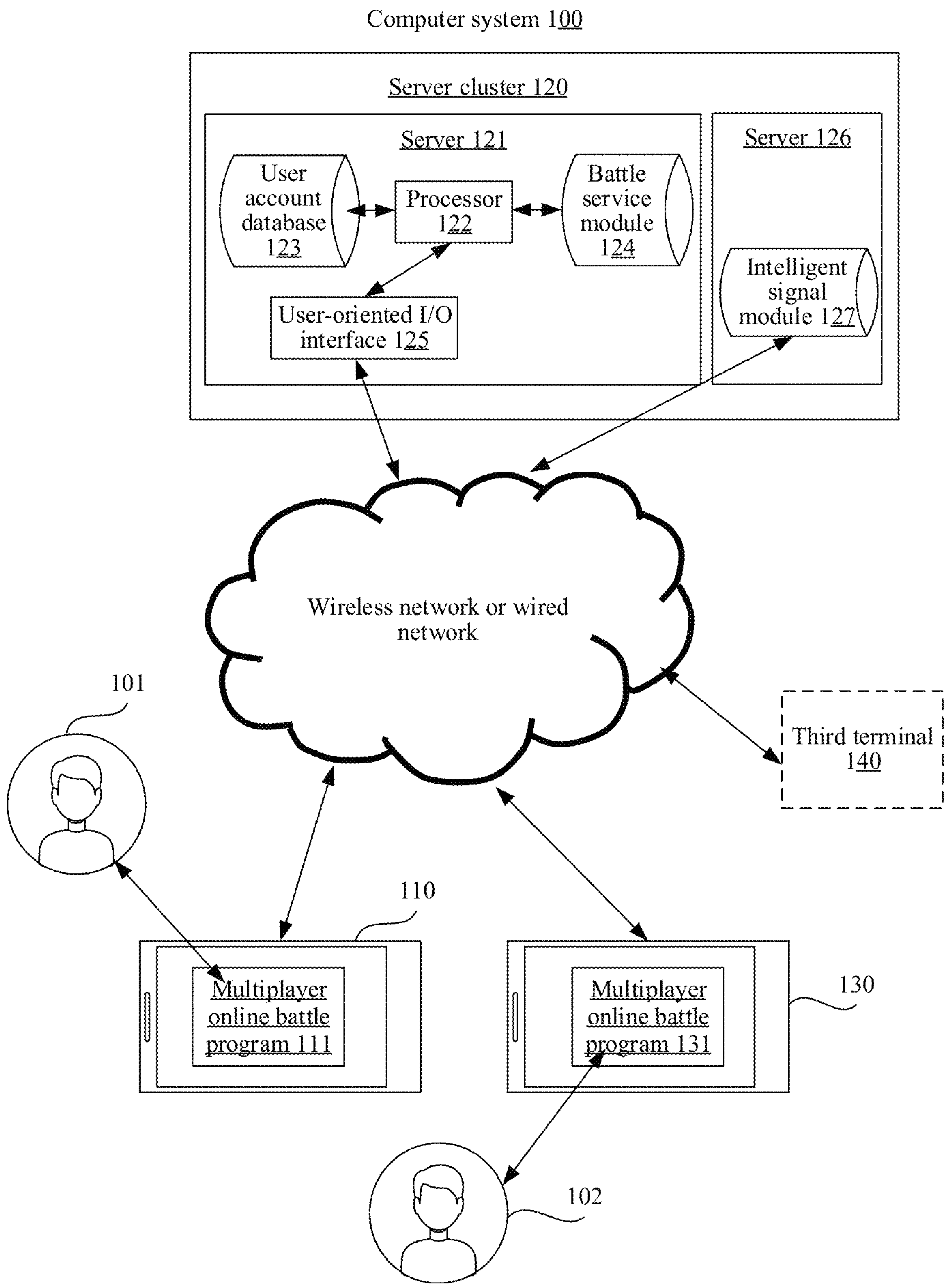
FIG. 1 is a schematic diagram of an example implementation environment according to one or more aspects described herein.

Aspects of the disclosure are described in detail herein, and the various aspects are illustratively shown in the accompanying drawings. When the following descriptions relate to the accompanying drawings, unless otherwise indicated, same numbers in different accompanying drawings represent same or similar elements. The implementations described herein do not represent all implementations consistent with this disclosure. On the contrary, the implementations are merely examples of apparatuses and methods that are described in detail in the appended claims and that are consistent with one or more aspects.

"“And/or” describes an association relationship of associated objects, indicating that three relationships may exist. For example, A and/or B may represent the following three cases: Only A exists, both A and B exist, and only B exists. The character “/” generally indicates an “or” relationship between the associated objects.

The following explains terms involved in this application.

1) Virtual Scene

A virtual scene is a scene displayed (or provided) when a computer application runs on a terminal. The virtual scene may be a simulated environment scene of a real world location, a semi-simulated semi-fictional three-dimensional environment scene, or a purely fictional three-dimensional environment scene. The virtual scene may be any one of a two-dimensional virtual scene, a 2.5-dimensional virtual scene, and a three-dimensional virtual scene. The following descriptions use an example in which the virtual scene is a three-dimensional virtual scene, but aspects described herein are not limited thereto. In some examples, the virtual scene may be further configured for a virtual scene battle between at least two virtual characters. In some arrangements, the virtual scene may be further configured for performing a battle between at least two virtual characters by using virtual items. In other examples, the virtual scene may be further configured for performing a battle between at least two virtual characters by using virtual items in a target area range, where the target area range continuously decreases with time in the virtual scene.

The virtual scene may be generated by an application in a computer device such as a terminal or a server, and displayed through hardware (for example, a screen) of the terminal. The computer device may be a mobile terminal such as a smartphone, a tablet computer, or an e-book reader; or the computer device may be a notebook computer or a personal computer device of a fixed computer; or the computer device may be a cloud server.

2) Virtual Object

A virtual object is a movable object in a virtual scene. The movable object may be at least one of a virtual character, a virtual animal, or a virtual vehicle. In some examples, when the virtual scene is the three-dimensional virtual scene, the virtual object is a three-dimensional model created based on an animation skeleton technology. Each virtual object has a shape, a volume, and an orientation in the three-dimensional virtual scene, and occupies a part of space in the three-dimensional virtual scene.

FIG. 1 is a block diagram of a structure of an example computer system. The computer system 100 includes: a first terminal 110, a server cluster 120, a second terminal 130, and a third terminal 140.

A client 111 supporting a virtual scene may be installed and run on the first terminal 110, and the client 111 may be a multiplayer online battle program. When the first terminal 110 runs the client 111, a user interface of the client 111 may be displayed on a screen of the first terminal 110. The client may be any one of a game client of a multiplayer online battle arena (MOBA) game, a shooting game, or the like. In this arrangement, an example in which the client is of a MOBA game is used for description. The first terminal 110 may be a terminal used by a first user 101, and the first user 101 may use the first terminal 110 to control movement of a first virtual object located in the virtual scene, where the first virtual object may be referred to as a master virtual object of the first user 101. Activities of the first virtual object may include, but are not limited to, at least one of adjusting body posture, crawling, walking, running, riding, flying, jumping, driving, picking, shooting, attacking, and throwing. For example, the first virtual object may be a first virtual character, such as a simulated character role or an animated character role.

A client 131 supporting the virtual scene may be installed and run on the second terminal 130, and the client 131 may be for a multiplayer online battle program. When the second terminal 130 runs the client 131, a user interface of the client 131 may be displayed on a screen of the second terminal 130. The client may be of any one of a MOBA game, a shooting game, or a simulation game (SLG, a strategy game). In this arrangement, an example in which the client is of a MOBA game is used for description. The second terminal 130 may be a terminal used by a second user 102, and the second user 102 may use the second terminal 130 to control movement of a second virtual object located in the virtual scene, where the second virtual object may be referred to as a master virtual object of the second user 102. For example, the second virtual object may be a second virtual character, such as a simulated character role or an animated character role.

In some arrangements, the first virtual character and the second virtual character may be in a same virtual scene. In some examples, the first virtual character and the second virtual character may belong to a same camp, a same team, or a same organization, and may have a friend relationship or a temporary communication permission. In some examples, the first virtual character and the second virtual character may belong to different camps, different teams, or different organizations, or may have a hostile relationship.

In some arrangements, clients installed on the first terminal 110 and the second terminal 130 may be the same, or the clients installed on the first terminal 110 and the second terminal 130 may be a same type of clients configured for different operating system platforms. The first terminal 110 may generally refer to one of a plurality of terminals, and the second terminal 130 may generally refer to another one of the plurality of terminals. In this example, only the first terminal 110 and the second terminal 130 are described. Device types of the first terminal 110 and the second terminal 130 may be the same or different, and may include at least one of a smartphone, a tablet computer, an e-book reader, a media player 1 (MP1), a media player 3 (MP3), a media player 4 (MP4), a laptop portable computer, or a desktop computer.

A client supporting a live streaming picture playing function may be installed and run on a viewer terminal 140 (e.g., the foregoing third terminal 140). Live streaming pictures of the virtual scene corresponding to the first terminal 110 and the second terminal 130 may be propagated to the viewer terminal 140 through the server cluster 120 for playing and displaying.

Only two terminals are shown in FIG. 1, but in various arrangements, there may be a plurality of other terminals that may access the server cluster 120. In some examples, there may be one or more terminals corresponding to a developer. A development and editing platform of the client of the virtual scene may be installed on the terminal corresponding to the developer. The developer may edit and update the client on the terminal, and transmit an updated client installation package to the server cluster 120 through a wired network or a wireless network. The first terminal 110 and the second terminal 130 may download the client installation package from the server cluster 120 to update the clients.

The first terminal 110, the second terminal 130, and the third terminal 140 may be connected to the server cluster 120 through the wireless network or the wired network.

The server cluster 120 may include at least one of a server, a plurality of servers, a cloud computing platform, and a virtualization center. The server 120 may be configured to provide a back-end service for a client supporting a three-dimensional virtual scene. In some examples, the server cluster 120 may undertake primary computing work, and the terminal may undertake secondary computing work; or the server cluster 120 may undertake the secondary computing work, and the terminal may undertake the primary computing work; or the server cluster 120 and the terminal may perform collaborative computing by using a distributed computing architecture.

In an illustrative example, the server cluster 120 may include a server 121 and a server 126, and the server 121 may include a processor 122, a user account database 123, a battle service module 124, and a user-oriented input/output interface (I/O interface) 125. The processor 122 may be configured to: load instructions stored in the server 121, and process data in the user account database 123 and the battle service module 124; the user account database 121 may be configured to store data of user accounts used by the first terminal 110, the second terminal 130, and the viewer terminal 140, such as an avatar of the user account, a nickname of the user account, a combat effectiveness index of the user account, and a service area in which the user account is located; the battle service module 124 may be configured to provide a plurality of battle rooms for users to battle, such as 1V1 battle, 3V3 battle, and 5V5 battle; and the user-oriented I/O interface 125 may be configured to establish communication and exchange data with the first terminal 110 and/or the second terminal 130 through the wireless network or the wired network. In some arrangements, the server 126 may be internally provided with an intelligent signal module 127, and the intelligent signal module 127 may be configured to transmit live streaming pictures of game scenes corresponding to the first terminal 110 and the second terminal 130 to the viewer terminal 140 in a specific signal mode for displaying and playing, where the signal mode of the live streaming picture may be intelligently determined by the intelligent signal module 127.

In the related art, when a live streaming application or a game application provides a game live streaming service, a plurality of different game perspectives may usually be provided for the user to select. Correspondingly, after the user manually selects a perspective, the live streaming application or the game application may switch to the perspective selected by the user to display a live streaming picture.

However, with the foregoing functionality, the user can only focus on one live streaming picture from one selected perspective at a time. When the user wants to focus on live streaming pictures from a plurality of perspectives, the user needs to switch between the plurality of perspectives, resulting in a cumbersome user operation, and negatively affecting human-computer interaction efficiency when the user wants to watch live streaming pictures from different perspectives. Moreover, the server needs to continuously provide the live streaming pictures from different perspectives based on the user operation. As a result, running load of the server may be high or large.

Figure 2:
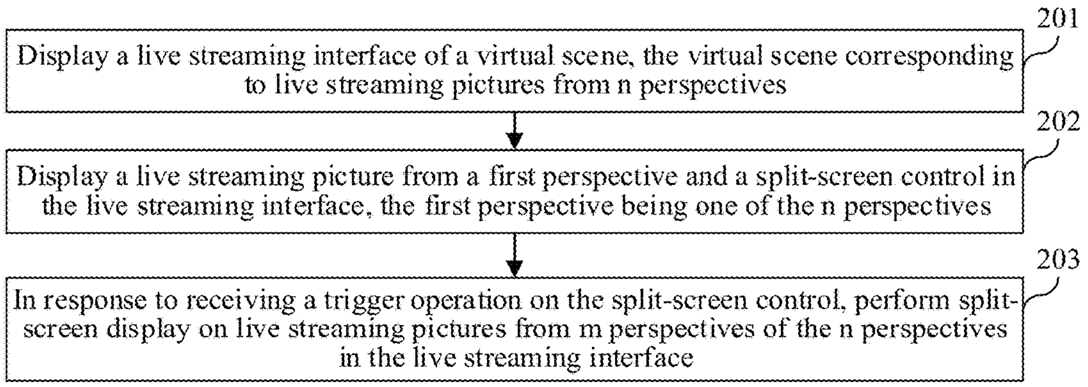
FIG. 2 is a flowchart of an example live streaming picture display method according to one or more aspects described herein.

FIG. 2 is a flowchart of an example live streaming picture display method (also referred to as a live streaming picture data processing method). The live streaming picture display method may be performed by a computer device, and the computer device may be a terminal. For example, the terminal may be the viewer terminal 140 shown in FIG. 1. As shown in FIG. 2, the live streaming picture display method may include the following operations:

Operation 201: Display a live streaming interface of a virtual scene, the virtual scene corresponding to live streaming pictures from n perspectives; n being greater than or equal to 2, and n being an integer.

In this arrangement, the live streaming interface may be a live streaming interface of a live streaming channel or an online live streaming room, and the live streaming channel or the online live streaming room may simultaneously correspond to live streaming pictures from a plurality of perspectives. The live streaming pictures from the plurality of perspectives are the live streaming pictures from the n perspectives, or the live streaming pictures from the n perspectives are the live streaming pictures from the plurality of perspectives, and are live streaming pictures from at least two perspectives.

In other words, the live streaming pictures from the n perspectives may be live streaming pictures provided by or through a single live streaming channel or a single online live streaming room. Each terminal accessing the live streaming channel or the online live streaming room may separately play live streaming pictures from different perspectives at the same time.

Operation 202: Display a live streaming picture from a first perspective and a split-screen control in the live streaming interface, the first perspective being one of the n perspectives.

In this arrangement, when a live streaming picture from a single perspective is displayed in the live streaming interface, the split-screen control may further be displayed in the live streaming interface, to trigger performing split-screen display on the live streaming pictures from the plurality of perspectives. The live streaming picture from the single perspective is the live streaming picture from the first perspective. In this example, live streaming picture data of the first perspective may be obtained, so that the live streaming picture from the first perspective and the split-screen control are displayed in the live streaming interface based on the live streaming picture data of the first perspective.

For example, split-screen display may refer to: splitting a screen of the computer device into a plurality of view areas, each view area displaying a live streaming picture from at least one perspective, so that a user using the computer device can simultaneously watch live streaming pictures from multiple perspectives displayed in the plurality of view areas. For example, each view area may display a live streaming picture from one perspective; in another example, each view area may display live streaming pictures from at least two perspectives; and in still another example, a part of the view area may display a live streaming picture from one perspective and another part of the view area may display live streaming pictures from at least two perspectives. These examples are not limiting. Additionally, or alternatively, the splitting the screen of the computer device may refer to splitting a live streaming interface displayed on the screen of the computer device.

Operation 203: In response to receiving a trigger operation on the split-screen control, perform split-screen display on live streaming pictures from m perspectives of the n perspectives in the live streaming interface, 2≤m≤n, and m being an integer.

In this arrangement, when the live streaming picture from a single perspective is displayed in the live streaming interface, and the trigger operation on the split-screen control by the user is received, the terminal may perform split-screen display on the live streaming pictures from a plurality of perspectives in the live streaming interface. The live streaming pictures from the plurality of perspectives may be the live streaming pictures from the m perspectives, or the live streaming pictures from the m perspectives may be the live streaming pictures from the plurality of perspectives, and are the live streaming pictures from the at least two perspectives. When m=n, the live streaming pictures from the m perspectives may be the live streaming pictures from the n perspectives, or the live streaming pictures from the m perspectives are live streaming pictures from all perspectives in the live streaming pictures from the n perspectives. When m<n, the live streaming pictures from the m perspectives may be live streaming pictures from a part of perspectives in the live streaming pictures from the n perspectives. According to one or more aspects, in response to receiving the trigger operation on the split-screen control, live streaming picture data of the m perspectives of the n perspectives may be obtained, and split-screen display may be performed on the live streaming pictures from the m perspectives in the live streaming interface based on the live streaming picture data of the m perspectives.

Based on a definition of split-screen display in the foregoing operation 202, the performing split-screen display on the live streaming pictures from the m perspectives of the n perspectives in the live streaming interface includes: splitting the live streaming interface into a plurality of view areas, each view area displaying a live streaming picture from at least one perspective in the live streaming pictures from the m perspectives, and the plurality of view areas displaying the live streaming pictures from the m perspectives in total. For example, when each view area displays a live streaming picture from one perspective, a value of m is the same as a quantity of the view areas, and the live streaming interface is split into m view areas. Each view area displays a live streaming picture from one perspective in the live streaming pictures from the m perspectives, and different view areas display live streaming pictures from different perspectives, to implement display of the live streaming pictures from the m perspectives in total in the m view areas. For another example, when at least one view area of the plurality of view areas displays live streaming pictures from at least two perspectives, the value of m may be greater than the quantity of view areas. Further examples are not described herein.

Using the foregoing techniques, when a user watches live streaming of a virtual scene, and simultaneously focuses on live streaming pictures from two or more perspectives, the terminal can simultaneously display the live streaming pictures from the two or more perspectives, and the user does not need to switch between the plurality of perspectives on which the user focuses. Instead, the user only needs to perform the trigger operation on the split-screen control, thereby greatly reducing switching operations by the user on the live streaming perspective, simplifying a quantity and types of operations required to be performed by the user during human-computer interaction, and improving human-computer interaction efficiency.

Additionally, using the foregoing techniques, a server might only need to continuously provide the live streaming pictures from the two or more perspectives to the terminal, and does not need to continuously switch a perspective of a live streaming picture provided to the terminal based on the switching operation by the user. In other words, the live streaming picture provided to the terminal might not need to be switched between the live streaming pictures from the different perspective, thereby reducing running load of the server and the number of user operations In summary, using techniques and aspects described herein, for a virtual scene that supports live streaming pictures from a plurality of perspectives, when a terminal displays a live streaming picture from one of the plurality of perspective in a live streaming interface, a user may trigger a split-screen control in the live streaming interface, to enable the terminal to simultaneously display live streaming pictures from two or more perspectives in a split-screen manner in the live streaming interface. This may allow the user to simultaneously focus on a plurality of perspectives, and can reduce user operations, improve data processing efficiency, and simplify the operation of the user, thereby improving human-computer interaction efficiency and reducing running load of a server to provide the live streaming pictures.

Figure 3:
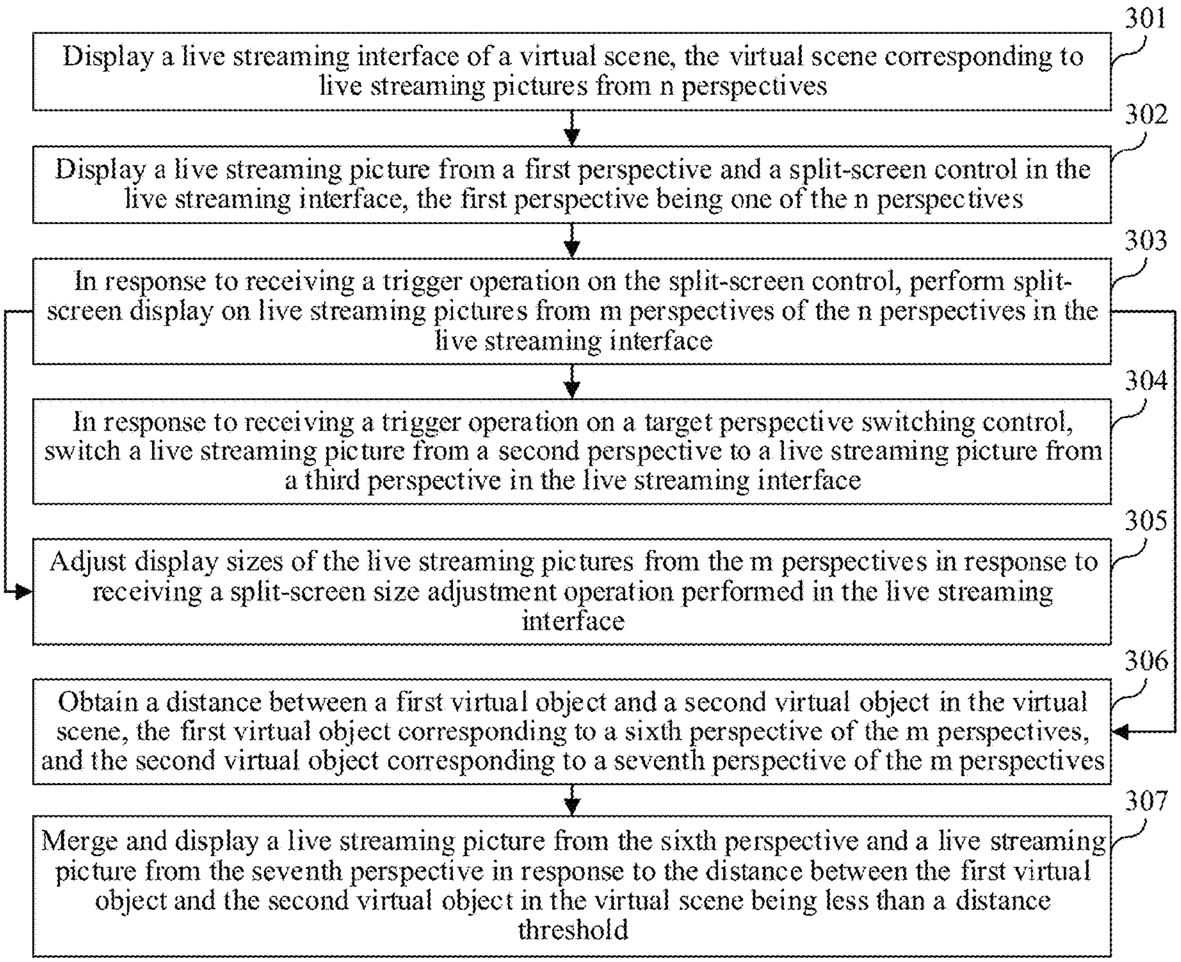
FIG. 3 is a flowchart of another example live streaming picture display method according to one or more aspects described herein.

FIG. 3 is a flowchart of another example live streaming picture display method (also referred to as a live streaming picture data processing method). The live streaming picture display method may be performed by a computer device, and the computer device may be a terminal. For example, the terminal may be the viewer terminal 140 shown in FIG. 1. As shown in FIG. 3, the live streaming picture display method may include the following operations:

Operation 301: Display a live streaming interface of a virtual scene, the virtual scene corresponding to live streaming pictures from n perspectives; and n being greater than or equal to 2, and n being an integer.

In this process, when a user enables a live streaming application of the virtual scene through the terminal, the user may tap a live streaming channel/live streaming room of the virtual scene, to display a live streaming interface of the virtual scene through the live streaming application.

The live streaming application may be a live streaming type application (for example, a live streaming platform application), or the live streaming application may be a virtual scene type application (for example, a game application) that supports a live streaming function.

Operation 302: Display a live streaming picture from a first perspective and a split-screen control in the live streaming interface, the first perspective being one of the n perspectives.

In this process, live streaming picture data of the first perspective may be obtained, and the live streaming picture from the first perspective and the split-screen control are displayed in the live streaming interface based on the live streaming picture data of the first perspective. In a possible implementation, when a live streaming picture from a single perspective is displayed in the live streaming interface, the split-screen control may further be displayed in the live streaming interface, to trigger the terminal to perform split-screen display on live streaming pictures from a plurality of perspectives through the live streaming interface.

Operation 303: In response to receiving a trigger operation on the split-screen control, perform split-screen display on live streaming pictures from m perspectives of the n perspectives in the live streaming interface, 2≤m≤n, and m being an integer.

In this process, in response to receiving the trigger operation on the split-screen control, live streaming picture data of the m perspectives of the n perspectives may be obtained, and split-screen display is performed on the live streaming pictures from the m perspectives in the live streaming interface based on the live streaming picture data of the m perspectives.

Figure 4:
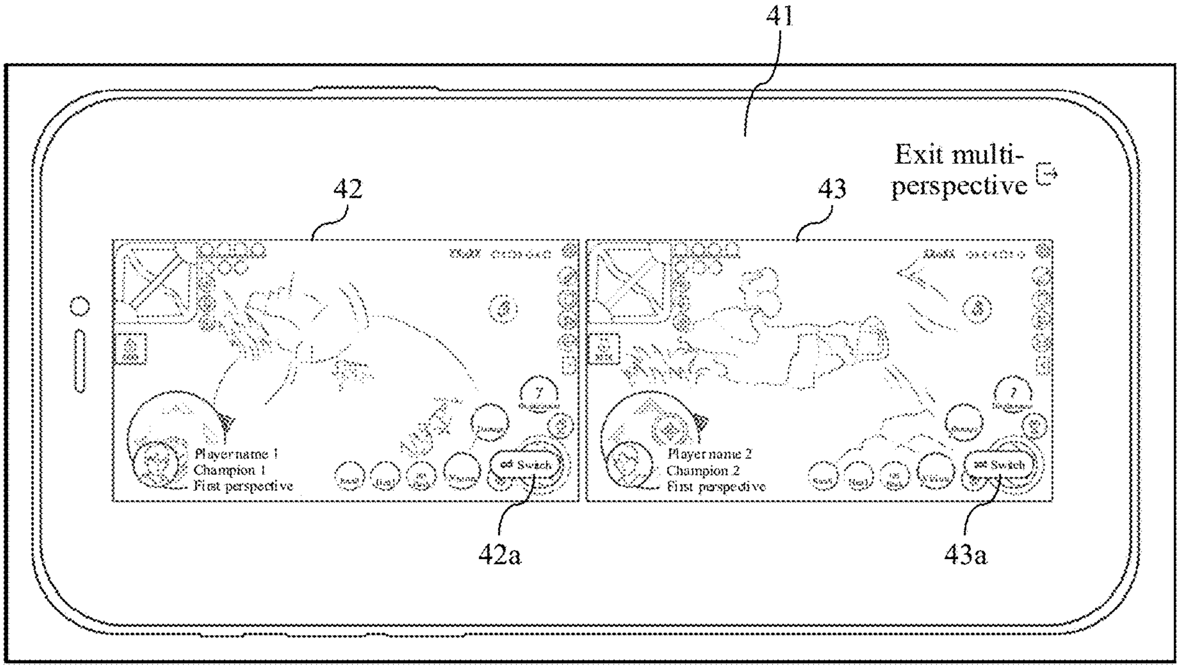
FIG. 4 is a schematic diagram of a split-screen effect according to one or more aspects described herein.

For example, FIG. 4 is a schematic diagram of an example split-screen effect. As shown in FIG. 4, the terminal may perform split-screen display on a live streaming picture 42 and a live streaming picture 43 in a live streaming interface 41, which respectively correspond to perspectives of different game players.

According to one or more aspects, processes and techniques for selection of the m perspectives displayed after the user triggers the split-screen control are described below.

In one or more examples, the terminal may display a second perspective selection interface in response to receiving the trigger operation on the split-screen control, where the second perspective selection interface includes selection controls respectively corresponding to the n perspectives; and the terminal may perform split-screen display on the live streaming pictures from the m perspectives in the live streaming interface based on a selection operation on selection controls of the m perspectives of the n perspectives. The selection controls respectively corresponding to the n perspectives may be also referred to as second selection controls. In other words, the second perspective selection interface may include n second selection controls. The terminal may perform split-screen display on the live streaming pictures from the m perspectives in the live streaming interface based on a selection operation on second selection controls of the m perspectives of the n perspectives. In other words, the terminal may display the second perspective selection interface in response to receiving the trigger operation on the split-screen control, where the second perspective selection interface includes the second selection controls respectively corresponding to the n perspectives; the live streaming picture data of the m perspectives of the n perspectives may be obtained based on the selection operation on the second selection controls of the m perspectives of the n perspectives; and split-screen display may be performed on the live streaming pictures from the m perspectives in the live streaming interface based on the live streaming picture data of the m perspectives.

In one or more examples, after the user triggers the split-screen control, the terminal may display selection controls respectively corresponding to the n perspectives to the user through a perspective selection interface, the user may select selection controls corresponding to the m perspectives and tap to confirm, and the terminal may perform split-screen display on live streaming pictures from perspectives corresponding to m selection controls selected by the user. For example, a value of n may be 5, and a value of m may be 2. After the user triggers the split-screen control, the terminal may display second selection controls respectively corresponding to five perspectives to the user through the perspective selection interface, and the user may select second selection controls corresponding to two of the five perspectives and tap to confirm. If the user taps to confirm second selection controls corresponding to any two perspectives, the terminal may perform split-screen display on live streaming pictures from the any two perspectives.

In some arrangements, the terminal may perform split-screen display on live streaming pictures from m perspectives that were recently displayed in the live streaming interface of the live streaming pictures from the n perspectives in the live streaming interface in response to receiving the trigger operation on the split-screen control. In other words, in response to receiving the trigger operation on the split-screen control, the live streaming picture data of the m perspectives of the n perspectives recently displayed may be obtained by default, and split-screen display may be performed on the live streaming pictures from the m perspectives recently displayed in the live streaming interface of the live streaming pictures from the n perspective in the live streaming interface based on the live streaming picture data of the m perspectives.

In some examples, after the user triggers the split-screen control, the terminal may alternatively determine live streaming pictures from m perspectives on which split-screen display needs to be performed. For example, the terminal may determine the live streaming pictures from the m perspectives recently displayed in the terminal, and perform split-screen display on the recently displayed live streaming pictures from the m perspectives.

In one or more arrangements, the terminal may perform split-screen display on live streaming pictures from default m perspectives of the n perspectives in the live streaming interface in response to receiving the trigger operation on the split-screen control. In other words, the terminal obtains the live streaming picture data of the m perspectives of the n perspectives in response to receiving the trigger operation on the split-screen control, and split-screen display may be performed on the live streaming pictures from the default m perspectives of the n perspectives in the live streaming interface based on the live streaming picture data of the m perspectives.

In some arrangements, after the user triggers the split-screen control, the terminal may alternatively perform split-screen display on the live streaming pictures from the default m perspectives in the live streaming interface. For example, the terminal may perform split-screen display on a live streaming picture from a free perspective or a live streaming picture from a perspective corresponding to a virtual object with a specific responsibility or role (for example, mid lane matchup) by default.

In one or more examples, the terminal may obtain quantities of viewers for the live streaming pictures from the n perspectives in response to receiving the trigger operation on the split-screen control; arrange the n perspectives based on the quantities of viewers for each perspective in descending order or in ascending order; and perform split-screen display on live streaming pictures from a first m perspectives in the live streaming interface based on the determined order. In other words, the terminal may obtain the quantities of the live streaming pictures from the n perspectives in response to receiving the trigger operation on the split-screen control; arrange the n perspectives based on the quantities of viewers in descending order or in ascending order; obtain live streaming picture data of m perspectives of the n perspectives; and perform split-screen display on the live streaming pictures from the first m perspectives in the live streaming interface based on live streaming picture data of the m perspectives.

In one or more arrangements, after the user triggers the split-screen control, the terminal may perform split-screen display on live streaming pictures from currently popular m perspectives based on the quantities of viewers in descending order, to be specific, split-screen display is performed on live streaming pictures from m perspectives that currently have larger quantities of viewers, to improve a display effect of the live streaming pictures.

Alternatively, after the user triggers the split-screen control, the terminal may perform split-screen display on live streaming pictures that currently have smaller quantities of viewers based on the quantities of viewers in ascending order, to balance each live streaming video stream and reduce freezing or lag.

The live streaming interface may include m perspective switching controls, and the m perspective switching controls respectively correspond to the m perspectives.

Operation 304: In response to receiving a trigger operation on a target perspective switch control, switch a live streaming picture from a second perspective to a live streaming picture from a third perspective in the live streaming interface.

The terminal may obtain live streaming picture data of the third perspective in response to receiving the trigger operation on the target perspective switching control, and switch the live streaming picture from the second perspective to the live streaming picture from the third perspective in the live streaming interface based on the live streaming picture data of the third perspective. The second perspective may be any one of the m perspectives; the target perspective switching control may be a perspective switching control corresponding to the second perspective in the m perspective switching controls; and the third perspective may be any one of the n perspectives other than the m perspectives.

In this process, when split-screen display is performed, each live streaming picture on which split screen is performed may correspond to one perspective switching control, and the user may trigger a perspective switching control of a live streaming picture, to switch the live streaming picture to a live streaming picture from another perspective, thereby improving flexibility of split-screen display of the plurality of perspectives.

For example, referring to FIG. 4, a switching control 42*a* and a switching control 43*a* may be respectively displayed at lower right corners of the live streaming picture 42 and the live streaming picture 43. The user may tap the switching control 42*a*, to switch the live streaming picture 42 to a live streaming picture from another perspective other than the live streaming picture 42 and the live streaming picture 43. In this example, the second perspective may be a perspective corresponding to the live streaming picture 42, the target perspective switching control may be the switching control 42*a*, and the third perspective may be the another perspective other than the live streaming picture 42 and the live streaming picture 43.

In this example, the user might not need to select the third perspective. When the user needs to switch the live streaming picture from the second perspective, the user may randomly select one or more perspectives from the n perspectives other than the m perspectives as the third perspective, so that a live streaming picture displayed in the live streaming interface is switched from the live streaming picture from the second perspective to the live streaming picture from the third perspective.

Alternatively, the third perspective may be selected by the user. In a possible implementation, the terminal may display a first perspective selection interface in response to receiving the trigger operation on the target perspective switching control, where the first perspective selection interface includes n-m first selection controls, and the n-m first selection controls respectively correspond to n-m third perspectives; and switch the live streaming picture from the second perspective to the live streaming picture from the third perspective in the live streaming interface in response to receiving a trigger operation on a target selection control, where the target selection control is any one of the n-m first selection controls, and the live streaming picture from the third perspective is a live streaming picture from a third perspective corresponding to the target selection control. For example, the terminal may obtain live streaming picture data of the third perspective in response to receiving the trigger operation on the target selection control, and switch the live streaming picture from the second perspective to the live streaming picture from the third perspective in the live streaming interface based on the live streaming picture data of the third perspective.

In this example, because the third perspective is a perspective of the n perspectives other than the m perspectives, a quantity of the third perspective may be n-m. If each third perspective corresponds to one first selection control, the quantity of the first selection controls is also n-m. In a split screen case, when the user switches a live streaming picture from a perspective, the terminal may display a first selection control corresponding to an optional third perspective through a perspective selection interface, and the user may select the first selection control to select a target perspective for switching. In the n-m first selection controls, the first selection control selected by the user may be the target selection control. Therefore, the live streaming picture of the third perspective may be a live streaming picture corresponding to the target selection control.

According to one or more aspects, the terminal may display the first perspective selection interface using a thumbnail map of the virtual scene as a background in response to receiving the trigger operation on the target perspective switching control; obtain positions of the n-m first selection controls in the thumbnail map; and display the n-m first selection controls in the first perspective selection interface based on the positions of the n-m first selection controls in the thumbnail map.

In one or more examples, to facilitate accurate user selection of a perspective that the user expects to watch, the terminal may display the thumbnail map in the perspective selection interface, and display the first selection controls based on the position in the thumbnail map, so that the user can more intuitively find a first selection control corresponding to a perspective on which the user focuses. The position of the first selection control in the thumbnail map may be a default position, for example, a hotspot position in the thumbnail map, and the hotspot position may be specified based on an actual requirement, or may be a position at which occurrence frequency of the virtual object is higher than a frequency threshold. Alternatively, the first selection control may correspond to a virtual object, and the position of the first selection control in the thumbnail map may be determined based on the virtual object. Refer to the following descriptions for details.

In some examples, for any first selection control, a position of the any first selection control in the thumbnail map may be obtained based on at least one of a responsibility of a virtual object corresponding to the any first selection control in the virtual scene and a camp to which the virtual object belongs in the virtual scene. For example, the terminal may obtain the position of the selection control in the thumbnail map based on the responsibility of the virtual object corresponding to the selection control in the virtual scene and the camp to which the virtual object corresponding to the selection control belongs in the virtual scene.

According to some aspects, positions of virtual objects with different responsibilities or roles and different camps in the virtual scene are usually different. For example, in a MOBA game scene, the responsibility of the virtual object may be understood as lane division, such as top lane matchup, mid lane matchup, bot lane matchup, or jungle; and in a first-person shooting game, the responsibility of the virtual object may include an assaulter, a medic, a sniper, or the like. By using the MOBA game type as an example, a virtual object of the mid lane may be usually located in a mid lane of the map, a virtual object of the jungle may be usually located in a jungle area of the camp, and the like. When displaying the first perspective selection interface, the terminal may set a first selection control of the perspective at a corresponding position in the thumbnail map based on at least one of a responsibility and a camp of a virtual object corresponding to a perspective. In this way, the user can quickly determine the perspective corresponding to the responsibility and the camp of the virtual object based on the position of the first selection control, so that the user can quickly screen out the perspective on which the user would like to focus.

In some examples, the terminal may obtain, for any first selection control, a position of the any first selection control in the thumbnail map based on a real-time position of a virtual object corresponding to the any first selection control in the virtual scene.

According to one or more aspects, when displaying the first perspective selection interface, the terminal may alternatively set a first selection control of a perspective corresponding to the virtual object in a corresponding position in the thumbnail map based on the real-time position of the virtual object in the virtual scene, and the position of the first selection control in the thumbnail map may move with movement of the virtual object. In this way, the user can quickly find out a perspective in which a highlight may appear through distribution of first selection controls in the thumbnail map.

In one or more arrangements, when any first selection control has a corresponding virtual object, the any first selection control may include a character avatar or a user avatar of the virtual object corresponding to the any first selection control.

Moreover, to facilitate the user's ability to accurately determine a first selection control on which the user focuses, when displaying the first perspective selection interface, the terminal may further display a character avatar or a user avatar of each virtual object in a first selection control of a perspective corresponding to the virtual object, so that the user may quickly find a player or a game character (for example, a specific champion) on which the user focuses. The character avatar of the virtual object may be used for finding a game character, and the game character may be a virtual object in the virtual scene. The user avatar may be used for finding a player, the user avatar may be the player avatar, and the player may be another user that controls the virtual object.

In one or more examples, the first perspective selection interface may further include an avatar switching control. For any first selection control, the terminal may switch the character avatar of the virtual object corresponding to the any first selection control to the user avatar, or switch the user avatar of the virtual object corresponding to the any first selection control to the character avatar in response to receiving a trigger operation on the avatar switching control.

The terminal may further set the avatar switching control in the first perspective selection interface, so that the user selects a selection control that is of interest to the user through the character avatar or the user avatar, thereby improving flexibility of avatar display.

Operation 305: Adjust display sizes of the live streaming pictures from the m perspectives in response to receiving a split-screen size adjustment operation performed in the live streaming interface.

In this process, when split-screen display is performed on the live streaming pictures from the plurality of perspectives, the user may have a particular focus on the plurality of perspectives. For example, the user may focus on a live streaming picture from one of the plurality of perspectives. In this case, to improve a split-screen display effect, the terminal may receive the split-screen size adjustment operation performed by the user, to adjust display sizes of live streaming pictures from all the perspectives on which split-screen display is performed, for example, scale up a live streaming picture from a perspective on which the user focuses, and scale down a live streaming picture from a perspective that the user is less focused on.

In one or more arrangements, the m perspectives may include a fourth perspective and a fifth perspective; a live streaming picture from the fourth perspective and a live streaming picture from the fifth perspective may correspond to size adjustment controls; and the terminal may adjust, in response to receiving a drag operation on the size adjustment control, a display size of the live streaming picture from the fourth perspective and a display size of the live streaming picture from the fifth perspective based on a drag direction and a drag distance of the drag operation. A position of the size adjustment control is not limited. For example, the size adjustment control may be located between the live streaming picture from the fourth perspective and the live streaming picture from the fifth perspective, or may be located at another position. A user may change the position of the size adjustment control based on an actual requirement.

Additionally, or alternatively, the terminal may set a size adjustment control between live streaming pictures from two perspectives, and the size adjustment control may receive the drag operation. When the user expects to adjust sizes of the live streaming pictures from the two perspectives, the user may drag the size adjustment control, and the terminal may adjust display sizes of the live streaming pictures from the two perspectives. For example, for the size adjustment control between the live streaming picture from the fourth perspective and the live streaming picture from the fifth perspective, when the user drags the size adjustment control toward the live streaming picture from the fourth perspective, the terminal may scale up the live streaming picture from the fifth perspective and scale down the live streaming picture from the fourth perspective.

Certainly, the terminal may alternatively display live streaming pictures from three or more perspectives. In such examples, the user may first select a live streaming picture of which a size needs to adjusted from the live streaming pictures from the three or more perspectives. After a selection operation by the user is detected, a size adjustment control corresponding to the selected live streaming picture may be displayed, the size of the selected live streaming picture may be changed based on an operation by the user on the size adjustment control, and sizes of live streaming pictures other than the selected live streaming picture in the three or more live streaming pictures may be adaptively and automatically adjusted by the terminal, thereby reducing user operations.

Operation 306: Obtain a distance between a first virtual object and a second virtual object in the virtual scene, the first virtual object corresponding to a sixth perspective of the m perspectives, and the second virtual object corresponding to a seventh perspective of the m perspectives.

In this process, the n perspectives may include perspectives respectively corresponding to at least two virtual objects in the virtual scene.

Operation 307: Merge and display a live streaming picture from the sixth perspective and a live streaming picture from the seventh perspective in response to the distance between the first virtual object and the second virtual object in the virtual scene being less than a distance threshold.

In this process, when there are perspectives corresponding to virtual objects in the n perspectives, if positions of two virtual objects in the virtual scene are close, perspectives of the two virtual objects may also be close. In this case, if split-screen display is performed on live streaming pictures from the two perspectives of the two virtual objects in the live streaming interface, the live streaming pictures from the two perspectives may be consequently close, and display sizes of both may be small. In this case, a display effect of the live streaming picture may be affected in turn. For example, that the display sizes are both small may mean that: a size of a live streaming picture from each of the two perspectives when split-screen display is performed may be smaller than a size of the live streaming picture from the single perspective when split-screen display is not performed. Based on this, because the live streaming pictures from the two perspectives may be close (e.g., have significantly overlapping content), the user might only need to focus on the live streaming picture from one of the two perspectives. Therefore, rather than continue to perform split-screen display based on the smaller size, the user may choose not to perform split-screen display based on a larger size, so that live streaming pictures from different perspectives can be merged. In one or more examples, when split-screen is performed on live streaming pictures from perspectives respectively corresponding to the two virtual objects, the terminal may temporarily merge the live streaming pictures from the two perspectives into one live streaming picture for displaying. The merged live streaming picture may be a live streaming picture from a single perspective, and a display area of the live streaming picture from the single perspective may be display areas of live streaming pictures from the original two perspectives, or the display area may be larger than the display areas of the live streaming pictures from the original two perspectives (in other words, an area of the live streaming picture becomes larger, and the area of the live streaming picture may also be understood as the display size of the live streaming picture).

A perspective of the merged live streaming picture may be one of the sixth perspective or the seventh perspective in some examples.

According to one or more aspects, the n perspectives further include a free perspective, and the free perspective may be a perspective not bound to a virtual object in the virtual scene; and the terminal may merge and display the live streaming picture from the sixth perspective and the live streaming picture from the seventh perspective as a live streaming picture from the free perspective in response to the distance between the first virtual object and the second virtual object in the virtual scene being less than the distance threshold, where a perspective position of the free perspective is located at a midpoint of a connection line between the first virtual object and the second virtual object. For example, the terminal may obtain live streaming picture data of the free perspective in response to the distance between the first virtual object and the second virtual object in the virtual scene being less than the distance threshold; and merge and display the live streaming picture from the sixth perspective and the live streaming picture from the seventh perspective as the live streaming picture from the free perspective based on the live streaming picture data of the free perspective.

In some arrangements, the free perspective may be a perspective of which the perspective position does not move with movement of the virtual object, but can be freely adjusted by the user.

According to one or more aspects, the perspective of the merged live streaming picture may be one of the sixth perspective and the seventh perspective, and the perspective may be implemented through the free perspective. Specifically, when the live streaming picture from the sixth perspective and the live streaming picture from the seventh perspective are merged and displayed, the terminal may determine a midpoint position of the connection line between the first virtual object and the second virtual object in the virtual scene, set the midpoint position as the perspective position of the free perspective, and then display the live streaming picture from the free perspective at original display positions of the live streaming picture from the sixth perspective and the live streaming picture from the seventh perspective. The midpoint position may be set as the perspective position of the free perspective, so that the live streaming picture can perform a smooth change during a transition from split-screen display to merged display, thereby improving the display effect of the live streaming picture.

In some examples, when the live streaming picture from the free perspective is used as a substitute live streaming picture for the merged live streaming picture from the sixth perspective and live streaming picture from the seventh perspective, because the first virtual object and the second virtual object are separated by a distance, in this case, the user may need to observe a larger area in the virtual scene. In addition, a longer distance between the two virtual objects indicates a larger scene area that the user needs to observe. In this case, the terminal may adjust a viewpoint height of the free perspective. For example, a larger distance between the first virtual object and the second virtual object indicates a higher viewpoint height that can be set, and correspondingly, a larger scene area that can be covered in the live streaming picture. Conversely, a smaller distance between the first virtual object and the second virtual object indicates a smaller scene area that the user needs to observe, and in this case, the viewpoint height may be set to be lower.

In some examples, after the operation of merging and displaying the live streaming picture from the sixth perspective and the live streaming picture from the seventh perspective, when the distance between the first virtual object and the second virtual object in the virtual scene is greater than the distance threshold, the terminal may restore split-screen display of the live streaming picture from the sixth perspective and the live streaming picture from the seventh perspective. For example, live streaming picture data of the sixth perspective and live streaming picture data of the seventh perspective may be obtained in response to the distance between the first virtual object and the second virtual object in the virtual scene being greater than the distance threshold; and split-screen display of the live streaming picture from the sixth perspective and the live streaming picture from the seventh perspective may be restored based on the live streaming picture data of the sixth perspective and the live streaming picture data of the seventh perspective. In this way, flexible switching between split-screen display and merged display can be automatically implemented, which is intelligent and improves a user viewing experience of watching the live streaming picture.

According to one or more aspects, when split-screen is performed, the terminal may receive an exit split-screen operation by the user, and display a live streaming picture from an eighth perspective in the live streaming interface. For example, live streaming picture data of the eighth perspective may be obtained in response to receiving the exit split-screen operation, and the live streaming picture from the eighth perspective is displayed in the live streaming interface based on the live streaming picture data of the eighth perspective. In this way, the user can switch between split-screen display and merged display based on an actual requirement, which is conducive to satisfying a preference of the user.

Further, in some examples, the live streaming picture from the eighth perspective may be a live streaming picture located at a specified position in the live streaming pictures from the m perspectives, for example, a live streaming picture located on the leftmost side, or a live streaming picture located on the rightmost side.

Alternatively, the live streaming picture from the eighth perspective may be a live streaming picture with the largest display size in the live streaming pictures from the m perspectives.

For example, when watching a single live streaming picture in full screen, the user may enter a split screen to simultaneously watch the live streaming pictures from the plurality of perspectives by tapping a "multi-perspective" button. After entering the split screen, the user may tap an "exit multi-perspective" button at an upper right corner, to return to the full screen to watch the single live streaming picture.

In summary, according to aspects described herein, for a virtual scene that supports live streaming pictures from a plurality of perspectives, when a terminal displays a live streaming picture from a perspective in a live streaming interface, a user may trigger a split-screen control in the live streaming interface, to enable the terminal to simultaneously display live streaming pictures from two or more perspectives in a split-screen manner in the live streaming interface. Such techniques may reduce user operations, improve data processing efficiency, and simplify the user operation when the user simultaneously focuses on the plurality of perspectives, thereby improving human-computer interaction efficiency and reducing running load of a server.

FIG. 5 to FIG. 10 are diagrams of example display effects of a live streaming split-screen interface. These example display effects are described in relation to a virtual scene such as a MOBA game scene, where m=2.

Figure 5:
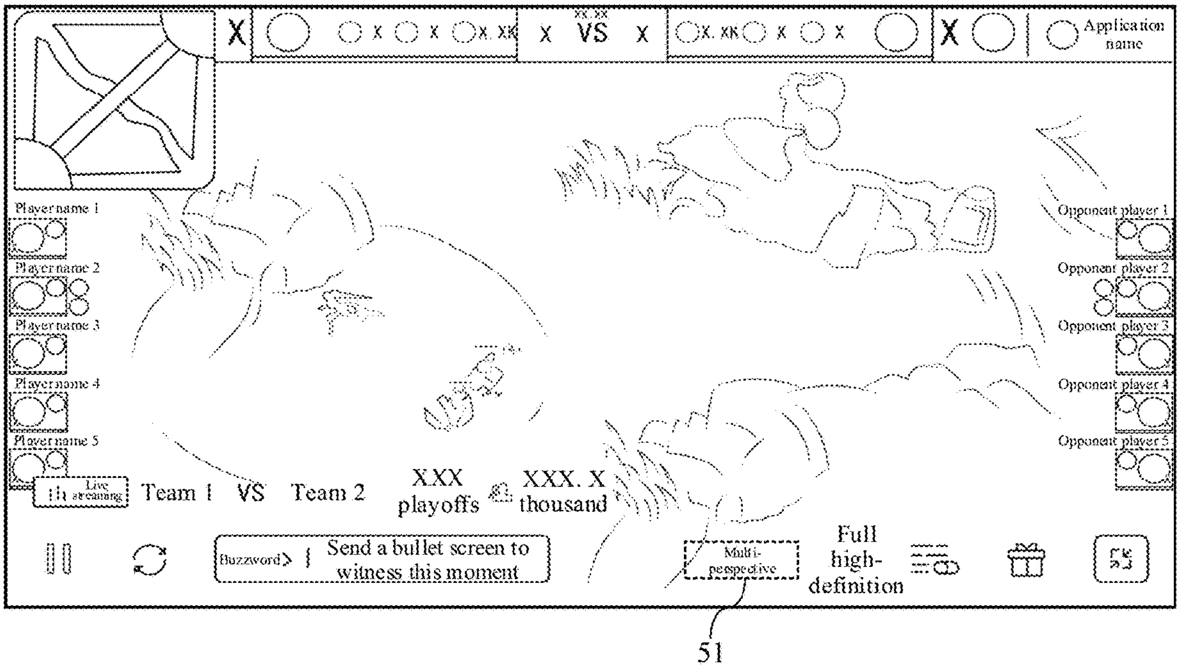
FIGS. 5-10 are example diagrams of interface display effects of a live streaming split-screen interface according to one or more aspects described herein.

As shown in FIG. 5, when there are live streaming video streams from a plurality of perspectives in a current live streaming channel/live streaming room, a terminal may display a "multi-perspective" control 51. If there are no live streaming video streams of a plurality of viewing angles, the control might not be displayed. If the "multi-perspective" control does not receive an operation in three seconds, the "multi-perspective" control may enter a hidden state.

Figure 6:
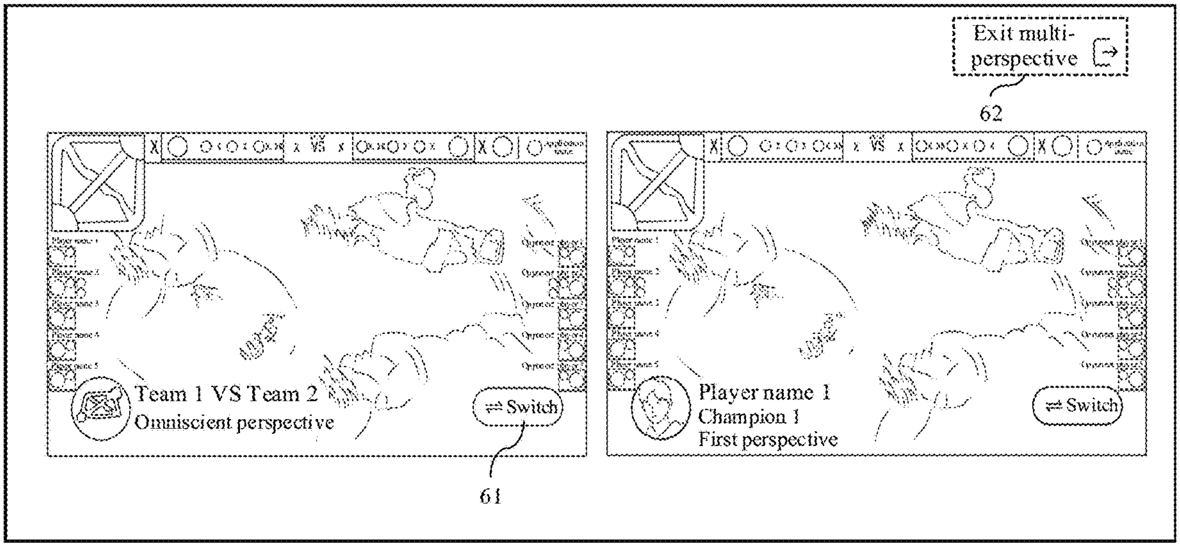

After a user taps on the "multi-perspective" control 51, as shown in FIG. 6, the terminal may perform split-screen display on live streaming pictures from two perspectives. There is a "switch" control 61 at a lower right corner of a live streaming picture from each perspective, and the user may call out a perspective selection interface shown in FIG. 7 or FIG. 8 by tapping the "switch" control 61; and an "exit multi-perspective" control 62 is further displayed at an upper right corner of the live streaming interface, and the user taps the control to return to a state of displaying a live streaming picture from a single perspective.

Figure 7:
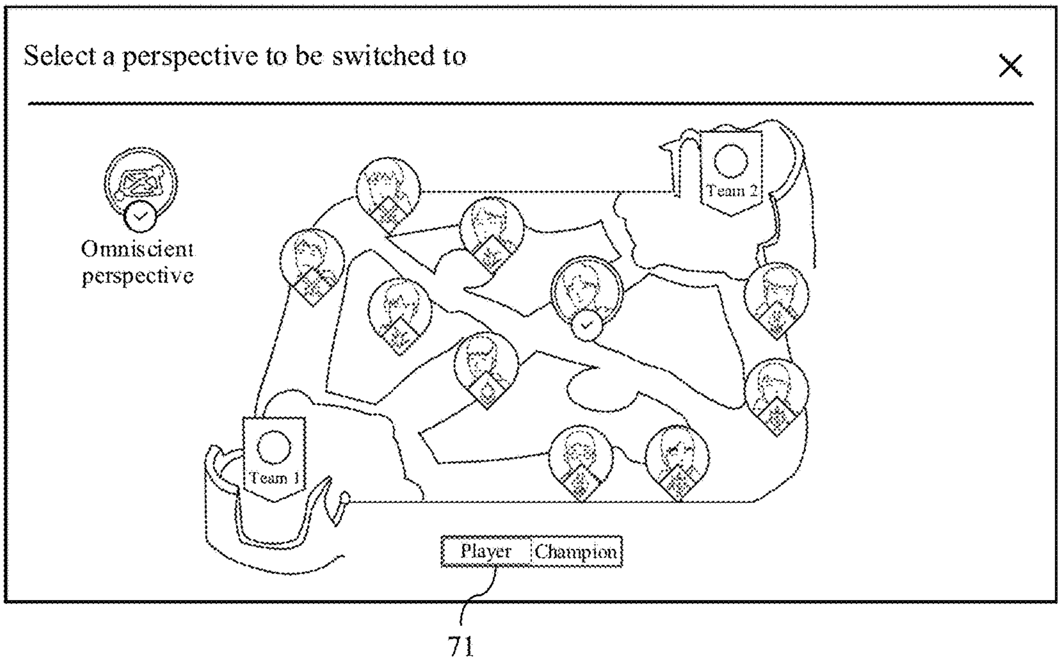
Figure 8:
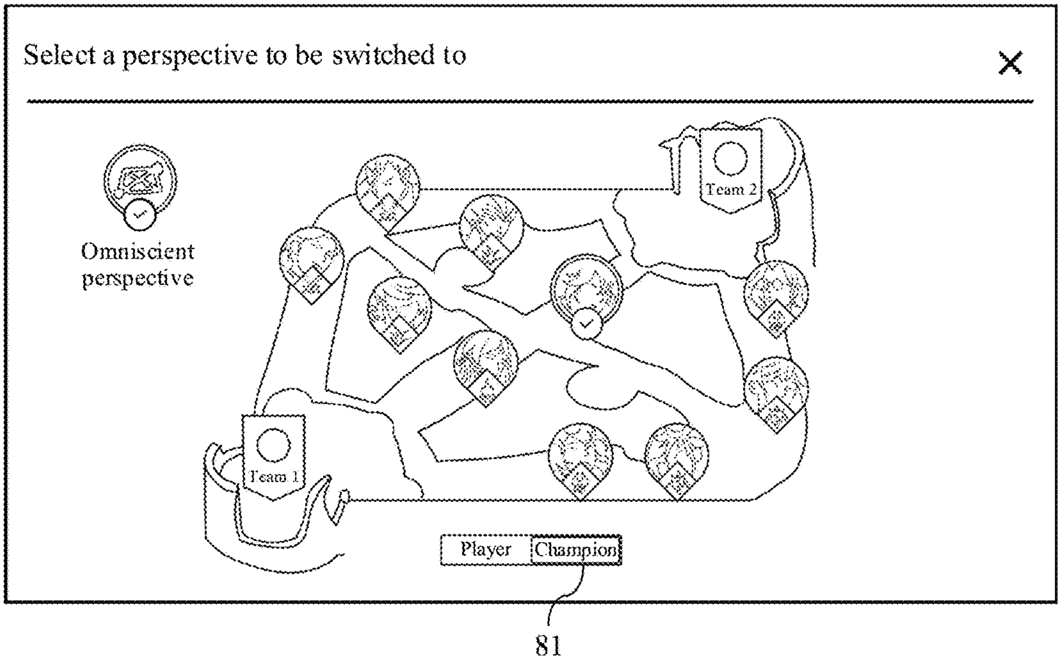

As shown in FIG. 7 or FIG. 8, the user may switch a player avatar or a champion avatar by tapping a "player" control 71 or a "champion" control 81, and each avatar corresponds to a perspective of a game character. The user taps the player avatar or the champion avatar, so that the perspective can be switched.

Figure 9:
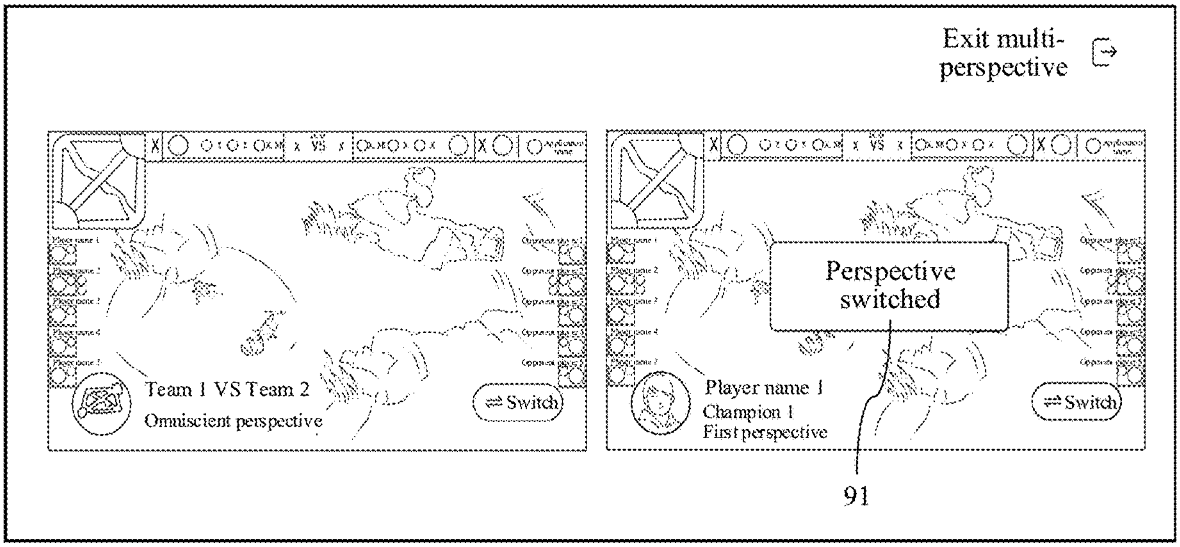

As shown in FIG. 9, after the user switches the perspective, a prompt 91 indicating that switching is completed, e.g., "perspective switched", may be displayed in a live streaming picture from the switched perspective.

Figure 10:
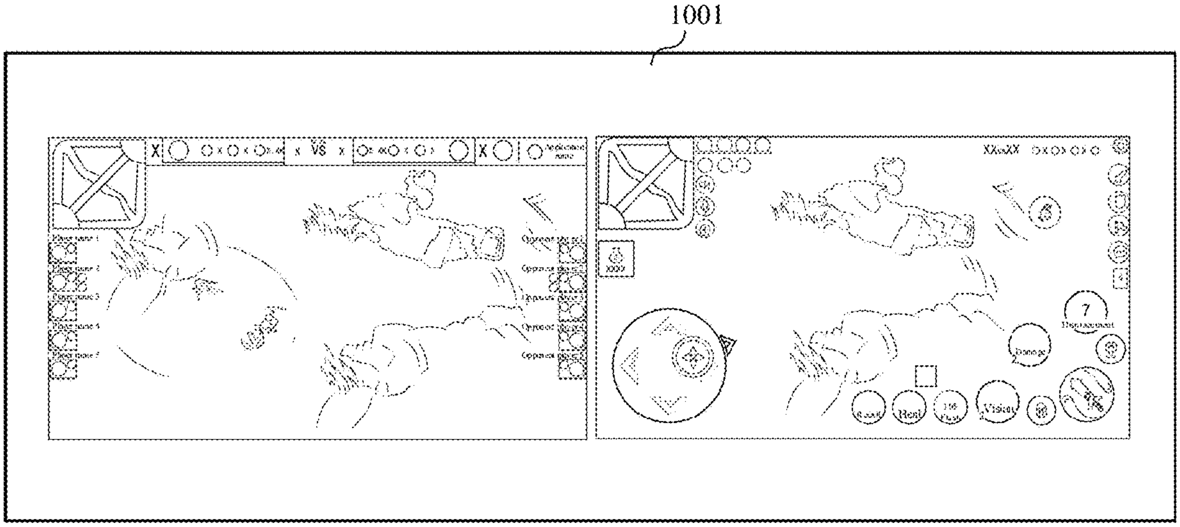

As shown in FIG. 10, when no further operation by the user is received in three seconds, the "switch" control and the "exit multi-perspective" control in a live streaming interface 1001 may be hidden.

Figure 11:
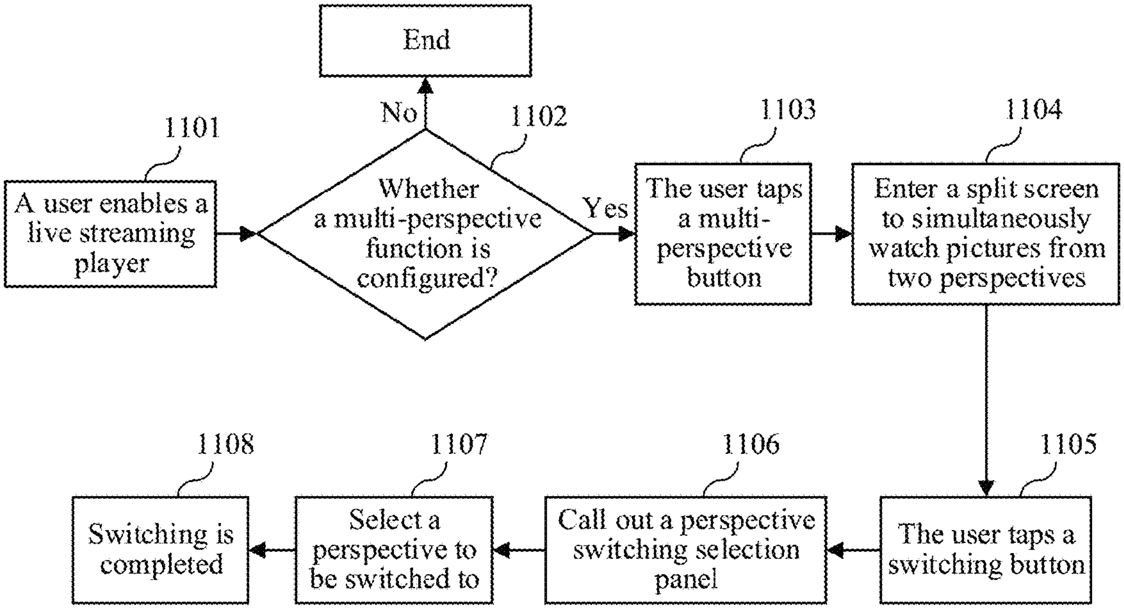
FIG. 11 is a schematic diagram of example split-screen logic according to one or more aspects described herein.

FIG. 11 is a schematic diagram of example split-screen logic. With reference to FIG. 5 to FIG. 10, as shown in FIG. 11, the user enables a live streaming player (operation S1101), and taps a video picture to call out a live streaming player operation bar, to determine whether a multi-perspective function is configured for event live streaming (operation S1102); and if the multi-perspective function is configured for the event live streaming, a multi-perspective button is displayed, and the user may tap the multi-perspective button (operation S1103), to enter a split screen to simultaneously watch pictures from two perspectives (operation S1104). The user may switch both the two live streaming perspectives, provided, for example, that the user taps a switching button (operation S1105), to call out a perspective switching selection panel (operation S1106); and selects a perspective to be switched to on the panel (operation S1107), so that switching can be completed (operation S1108).

Figure 12:
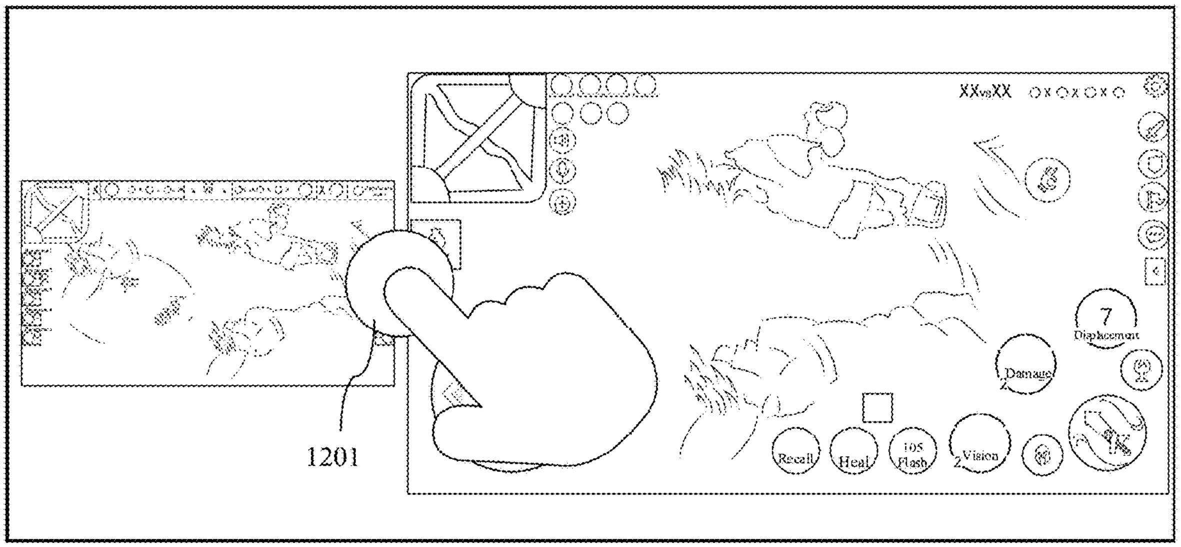
FIG. 12 is an example schematic diagram of size adjustment according to one or more aspects described herein.

The user may further press adjustment controls in the two pictures, to freely scale up or scale down scales of the two pictures to an expected appearance. To ensure normal visual experience of the two pictures, the scale to which the picture can be adjusted may be defined, where, in one or more examples, a single video picture can be scaled down to a minimum of 33% of a visual width of an entire screen, and can be scaled up to a maximum of 66% of the visual width of the entire screen. 33% and 66% are merely examples, and are not intended to constitute a limitation. According to some arrangements, a minimum scale-down scale of the single video picture may be greater than 33% or less than 33%, and a maximum scale-up scale of the single video picture may be greater than 66% or less than 66%. FIG. 12 is a schematic diagram of example size adjustment. As shown in FIG. 12, the user may tap and drag a contact position 1201 between the two live streaming pictures, so that sizes of the two live streaming pictures can be adjusted.

Figure 13:
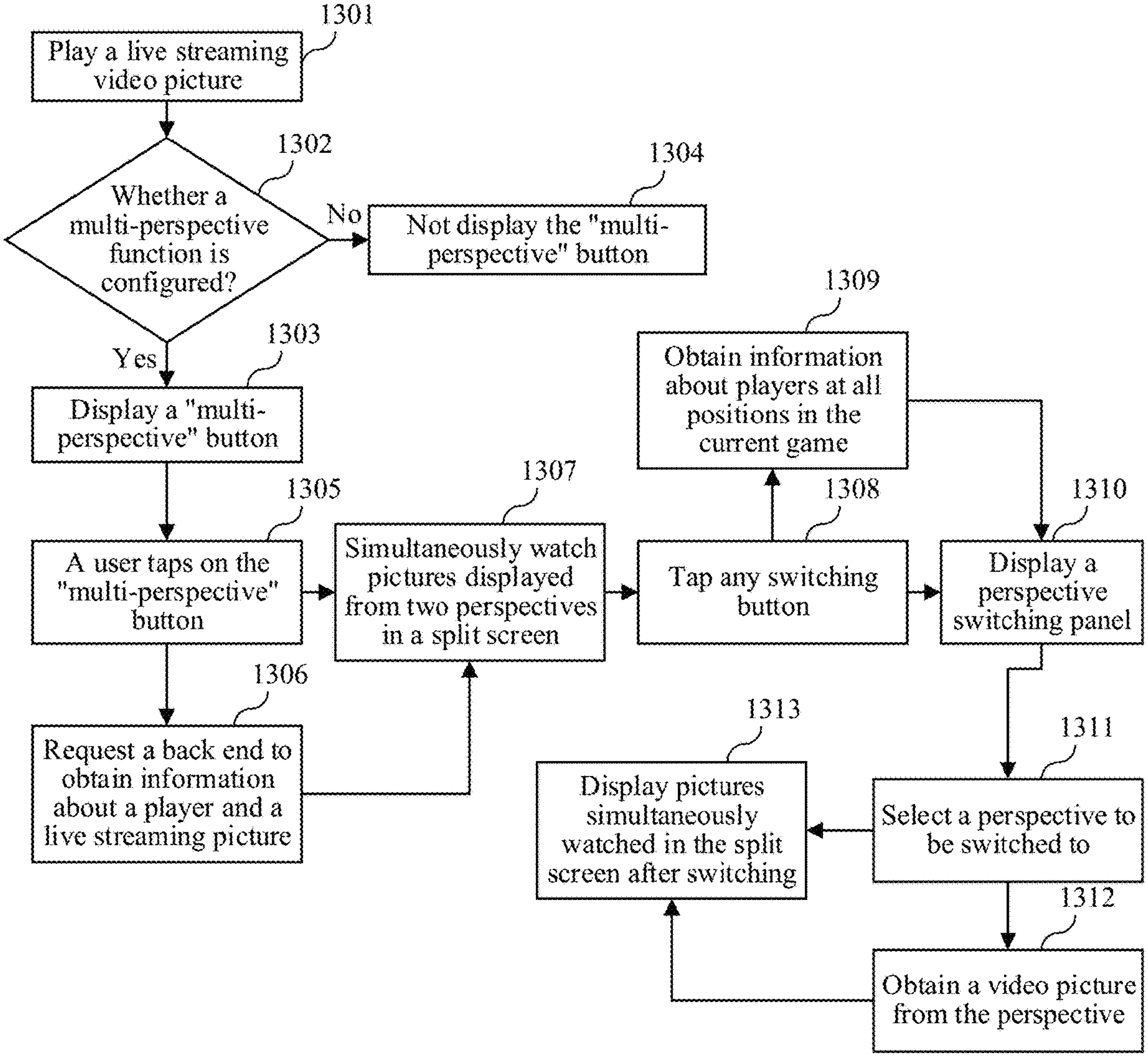
FIG. 13 is a flowchart of example front-end logic according to one or more aspects described herein.

The processes and techniques described herein may be implemented on a mobile terminal. FIG. 13 is a flowchart of example front-end logic. As shown in FIG. 13, a live streaming video picture may be played at a front end (operation S1301); it may be detected whether a "multi-perspective" function is configured (operation S1302) when a user calls out a playback control progress bar; and if the "multi-perspective" function is configured, a "multi-perspective" button may be displayed (operation S1303), otherwise, the "multi-perspective" button might not displayed (operation S1304). The user may tap on the "multi-perspective" button (operation S1305), to request a back end to obtain information about a player in a current game and a first perspective live streaming picture of the player (operation S1306); and after the information and the live streaming picture are obtained, the front end may respond by entering a split screen to simultaneously watch pictures displayed from two perspectives (operation S1307). When the user is in a state of simultaneously watching the two pictures on the split screen, the user may tap any switching button (operation S1308), to request the back end to obtain information about players at all positions in the current game (operation S1309); and after the information is obtained, the front end may respond by displaying a perspective switching panel (operation S1310). The user may complete selection of a perspective to be switched to (operation S1311), to request the back end to obtain a video picture from the perspective (operation S1312); and after the picture is obtained, the front end may display pictures simultaneously watched in the split screen after switching (operation S1313).

Figure 14:
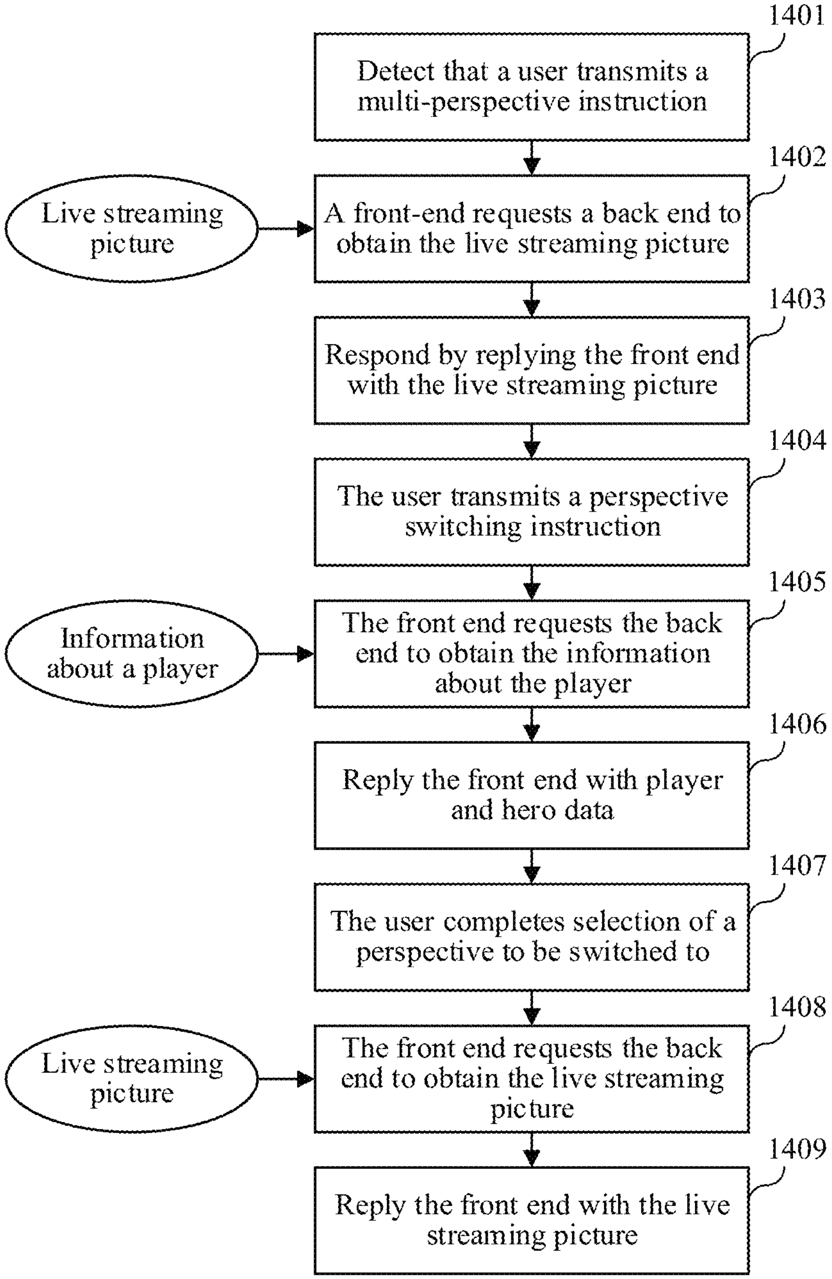
FIG. 14 is a flowchart of example back-end logic according to one or more aspects described herein.

FIG. 14 is a flowchart of example back-end logic. As shown in FIG. 14, a front end may detect that a user transmits a multi-perspective instruction (operation S1401); the front-end may request a back end to obtain a first perspective live streaming picture of a player in a current game (operation S1402); and the back end may respond by replying the front end with a first perspective video picture database of the player (operation S1403).

When the user transmits a perspective switching instruction (operation S1404), the front end may request the back end to obtain information about all players in the current game (operation S1405); and the back end may respond by replying the front end with player and champion data in the current game (operation S1406).

The user may complete selection of a perspective to be switched (operation S1407); the front end may request the back end to obtain a first perspective live streaming picture of a corresponding player or champion (operation S1408); and the back end may pack first perspective video picture data of the player and respond by replying the front end with the data (that is, operation S1409).

With progress of mobile phone technologies, screens of mobile devices are becoming larger. To meet a plurality of game watching needs of users, this application provides a solution for using a split screen to watch a plurality of perspectives. When watching event live streaming, the user can simultaneously watch at least two live streaming video pictures from different perspectives by splitting the screen into at least two view areas. The user may simultaneous watch from an omniscient perspective and a first perspective of a favorite player of the user. Alternatively, the user may simultaneously watch first perspectives of two players, compare game levels of the two players, and learn a game battle technology.

Figure 15:
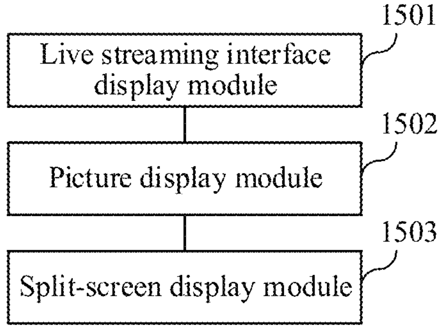
FIG. 15 is a block diagram of an example live streaming picture display apparatus according to one or more aspects described herein.

FIG. 15 is a block diagram of an example live streaming picture display apparatus (also referred to as a live streaming picture data processing apparatus). The live streaming picture display apparatus may be applied to a computer device, to perform all or some of operations performed by a terminal in the methods shown in FIG. 2 or FIG. 3. As shown in FIG. 15, the live streaming picture display apparatus may include:

a live streaming interface display module 1501, configured to display a live streaming interface of a virtual scene, the virtual scene corresponding to live streaming pictures from n perspectives; and n being greater than or equal to 2, and n being an integer;

a picture display module 1502, configured to display a live streaming picture from a first perspective and a split-screen control in the live streaming interface, for example, configured to obtain live streaming picture data of the first perspective, and display the live streaming picture from the first perspective and the split-screen control in the live streaming interface based on the live streaming picture data of the first perspective, the first perspective being one of the n perspectives; and a split-screen display module 1503, configured to perform split-screen display on live streaming pictures from m perspectives of the n perspectives in the live streaming interface in response to receiving a trigger operation on the split-screen control, $2 \le m \le n$, and m being an integer.

In some arrangements, the live streaming interface may include m perspective switching controls, and the m perspective switching controls respectively may correspond to the m perspectives; and the apparatus may further include: a switching module, configured to switch a live streaming picture from a second perspective to a live streaming picture from a third perspective in the live streaming interface in response to receiving a triggering operation on a target perspective switching control, for example, obtain live streaming picture data of the third perspective in response to receiving the trigger operation on the target perspective switching control, and switch the live streaming picture from the second perspective to the live streaming picture from the third perspective in the live streaming interface based on the live streaming picture data of the third perspective, the second perspective being any one of the m perspectives; the target perspective switching control may be a perspective switching control corresponding to the second perspective in the m perspective switching controls; and the third perspective may be any one of the n perspectives other than the m perspectives.

According to one or more aspects, the switching module may be configured to display a first perspective selection interface in response to receiving the trigger operation on the target perspective switching control, the first perspective selection interface including n-m first selection controls, and the n-m first selection controls respectively corresponding to n-m third perspectives; and switch the live streaming picture from the second perspective to the live streaming picture from the third perspective in the live streaming interface in response to receiving a trigger operation on a target selection control, for example, obtain the live streaming picture data of the third perspective in response to receiving the trigger operation on the target selection control, and switch the live streaming picture from the second perspective to the live streaming picture from the third perspective in the live streaming interface based on the live streaming picture data of the third perspective, the target selection control being any one of the n-m first selection controls, and the live streaming picture from the third perspective being a live streaming picture from a third perspective corresponding to the target selection control.

In some examples, the switching module may be configured to display the first perspective selection interface using a thumbnail map of the virtual scene as a background in response to receiving the trigger operation on the target perspective switching control; obtain positions of the n-m first selection controls in the thumbnail map; and display the n-m first selection controls in the first perspective selection interface based on the positions of the n-m first selection controls in the thumbnail map.

Additionally, or alternatively, the switching module may be configured to obtain, for any first selection control, a position of the any first selection control in the thumbnail map based on at least one of a responsibility of a virtual object corresponding to the any first selection control in the virtual scene and a camp to which the virtual object belongs in the virtual scene.

In some examples, the switching module may be configured to obtain, for any first selection control, a position of any of the first selection control in the thumbnail map based on a real-time position of a virtual object corresponding to the first selection control in the virtual scene.

In some arrangements, when any first selection control corresponds to a virtual object, the first selection control may include a character avatar or a user avatar of the virtual object corresponding to the first selection control.

According to one or more aspects, the first perspective selection interface may further include an avatar switching control; and the apparatus may further include: an avatar switching control, configured to switch, for any first selection control, the character avatar of the virtual object corresponding to the first selection control to the user avatar, or switch the user avatar of the virtual object corresponding to the first selection control to the character avatar in response to receiving a trigger operation on the avatar switching control.

In some examples, the apparatus may further include: a size adjustment module, configured to adjust display sizes of the live streaming pictures from the m perspectives in response to receiving a split-screen size adjustment operation performed in the live streaming interface.

In one or more arrangements, the m perspectives may include a fourth perspective and a fifth perspective; a live streaming picture from the fourth perspective and a live streaming picture from the fifth perspective may correspond to size adjustment controls; and the size adjustment module may be configured to adjust, in response to receiving a drag operation on the size adjustment control, a display size of the live streaming picture from the fourth perspective and a display size of the live streaming picture from the fifth perspective based on a drag direction and a drag distance of the drag operation.

According to one or more aspects, the split-screen display module 1503 may be configured to display a second perspective selection interface in response to receiving the trigger operation on the split-screen control, the second perspective selection interface including second selection controls respectively corresponding to the n perspectives; and perform split-screen display on the live streaming pictures from the m perspectives in the live streaming interface based on a selection operation on selection controls of the m perspectives of the n perspectives, for example, obtain live streaming picture data of the m perspectives of the n perspectives based on the selection operation on the selection controls of the m perspectives of the n perspectives; and perform split-screen display on the live streaming pictures from the m perspectives in the live streaming interface based on the live streaming picture data of the m perspectives.

In some examples, the split-screen display module 1503 may be configured to perform split-screen display on live streaming pictures from m perspectives recently displayed in the live streaming interface of the live streaming pictures from the n perspective in the live streaming interface in response to receiving the trigger operation on the split-screen control, for example, obtain the live streaming picture data of the m perspectives of the n perspectives in response to receiving the trigger operation on the split-screen control; and perform split-screen display on the live streaming pictures from the m perspectives recently displayed in the live streaming interface of the live streaming pictures from the n perspectives in the live streaming interface based on the live streaming picture data of the m perspectives.

Additionally, alternatively, the split-screen display module 1503 may be configured to perform split-screen display on live streaming pictures from default m perspectives of the n perspectives in the live streaming interface in response to receiving the trigger operation on the split-screen control, for example, obtain the live streaming picture data of the m perspectives of the n perspectives in response to receiving the trigger operation on the split-screen control; and perform split-screen display on the live streaming pictures from the default m perspectives of the n perspectives in the live streaming interface based on the live streaming picture data of the m perspectives.

In some arrangements, the split-screen display module 1503 may be configured to obtain quantities of viewers for the live streaming pictures from the n perspectives in response to receiving the trigger operation on the split-screen control; arrange the n perspectives based on the quantities of viewers in descending order or in ascending order; and perform split-screen display on live streaming pictures from first m perspectives in the live streaming interface, for example, obtain the quantities of the live streaming pictures from the n perspectives in response to receiving the trigger operation on the split-screen control; arrange the n perspectives based on the quantities of viewers in descending order or in ascending order; obtain live streaming picture data of the m perspectives of the n perspectives; and perform split-screen display on the live streaming pictures from the first m perspectives in the live streaming interface based on the live streaming picture data of the m perspectives.

In one or more examples, the n perspectives may include perspectives respectively corresponding to at least two virtual objects in the virtual scene; and the apparatus may further include: a distance obtaining module, configured to obtain a distance between a first virtual object and a second virtual object in the virtual scene, the first virtual object corresponding to a sixth perspective of the m perspectives, and the second virtual object corresponding to a seventh perspective of the m perspectives; and a picture merging module, configured to merge and display a live streaming picture from the sixth perspective and a live streaming picture from the seventh perspective in response to the distance between the first virtual object and the second virtual object in the virtual scene being less than a distance threshold.

According to one or more aspects, the n perspectives may further include a free perspective; and the free perspective may be a perspective not bound to a virtual object in the virtual scene; and the picture merging module is configured to merge and display the live streaming picture from the sixth perspective and the live streaming picture from the seventh perspective as a live streaming picture from the free perspective in response to the distance between the first virtual object and the second virtual object in the virtual scene being less than the distance threshold, a perspective position of the free perspective being located at a midpoint of a connection line between the first virtual object and the second virtual object, for example, obtain live streaming picture data of the free perspective in response to the distance between the first virtual object and the second virtual object in the virtual scene being less than the distance threshold; and merge and display the live streaming picture from the sixth perspective and the live streaming picture from the seventh perspective as the live streaming picture from the free perspective based on the live streaming picture data of the free perspective.

In some arrangements, the picture merging module may be further configured to restore split-screen display of the live streaming picture from the sixth perspective and the live streaming picture from the seventh perspective in response to the distance between the first virtual object and the second virtual object in the virtual scene being greater than the distance threshold, for example, obtain live streaming picture data of the sixth perspective and live streaming picture data of the seventh perspective in response to the distance between the first virtual object and the second virtual object in the virtual scene being greater than the distance threshold; and restore split-screen display of the live streaming picture from the sixth perspective and the live streaming picture from the seventh perspective based on the live streaming picture data of the sixth perspective and the live streaming picture data of the seventh perspective.

According to one or more aspects, the split-screen display module 1503 may be further configured to display a live streaming picture from an eighth perspective in the live streaming interface in response to receiving an exit split-screen operation, the live streaming picture from the eighth perspective being a live streaming picture located at a specified position or a live streaming picture with a maximum display size in the live streaming pictures from the m perspectives, for example, obtain live streaming picture data of the eighth perspective in response to receiving the exit split-screen operation, and display the live streaming picture from the eighth perspective in the live streaming interface based on the live streaming picture data of the eighth perspective, the live streaming picture from the eighth perspective being the live streaming picture located at the specified position or the live streaming picture with the maximum display size in the live streaming pictures from the m perspectives.

In summary, in the techniques, processes and systems described herein, for a virtual scene that supports live streaming pictures from a plurality of perspectives, when a terminal displays a live streaming picture from a perspective in a live streaming interface, a user may trigger a split-screen control in the live streaming interface, to enable the terminal to simultaneously display live streaming pictures from two or more perspectives in a split-screen manner in the live streaming interface, which can reduce user operations, improve data processing efficiency, and simplify the user operation when the user simultaneously focuses on the plurality of perspectives, thereby improving human-computer interaction efficiency and reducing running load of a server.

Figure 16:
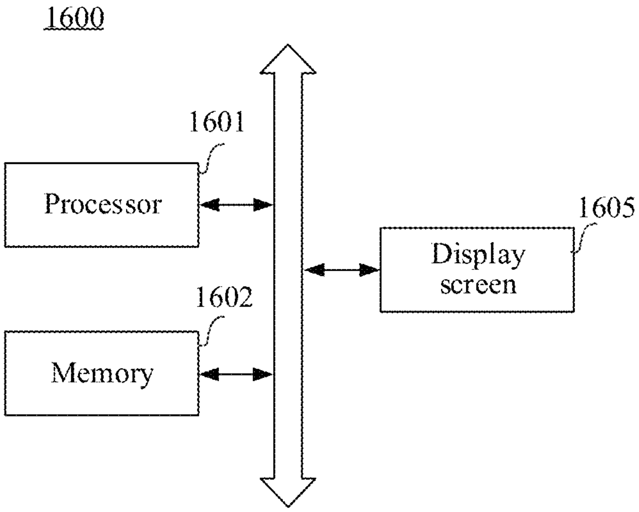
FIG. 16 is a block diagram of an example structure of a computer device according to one or more aspects described herein.

FIG. 16 is a block diagram of a structure of an example computer device 1600. The computer device 1600 may be a portable mobile terminal, such as a smartphone, a tablet computer, or a personal computer, or the like.

Generally, the computer device 1600 may include a processor 1601 and a memory 1602.

The processor 1601 may include one or more processing cores, such as a 4-core processor or an 8-core processor. The processor 1601 may be implemented in at least one hardware form of a digital signal processor (DSP), a field-programmable gate array (FPGA), or a programmable logic array (PLA). The processor 1601 may also include a main processor and a coprocessor. The main processor may be a processor configured to process data in an awake state, and may be also referred to as a central processing unit (CPU); and the coprocessor may be a low power consumption processor configured to process data in a standby state. In some arrangements, the processor 1601 may be integrated with a graphics processing unit (GPU), and the GPU may be configured to render and draw content that needs to be displayed on a display screen. In some examples, the processor 1601 may further include an artificial intelligence (AI) processor, and the AI processor may be configured to process computing operations related to machine learning.

The memory 1602 may include one or more computer-readable storage media, and the computer-readable storage medium may be non-transient. The non-transient computer-readable storage medium may also be referred to as a non-volatile computer-readable storage medium, or a non-transitory computer-readable storage medium. The memory 1602 may further include a high-speed random access memory and a non-volatile memory, such as one or more disk storage devices or flash storage devices. In some examples, the non-transient computer-readable storage medium in the memory 1602 may be configured to store at least one computer instruction, and the at least one computer instruction may be configured to be executed by the processor 1601, to enable the computer device to implement all or some of operations performed by the terminal device in the live streaming picture display methods and processes (also referred to as the live streaming picture data processing methods) described herein.

In some examples, the computer device 1600 may further optionally include a display screen 1605, and the display screen 1605 may be configured to display live streaming pictures of perspectives. The display screen 1605 may be configured to display a user interface (UI). The UI may include a graph, text, an icon, a video, and any combination thereof. When the display screen 1605 is a touch display screen, the display screen 1605 further may have a capability of collecting a touch signal on or above a surface of the display screen 1605. The touch signal may be inputted to the processor 1601 as a control signal for processing. In this case, the display screen 1605 may be further configured to provide a virtual button and/or a virtual keyboard that are/is also referred to as a soft button and/or a soft keyboard. In some examples, there may be one display screen 1605, disposed on a front panel of the computer device 1600. In some other examples, there may be at least two display screens 1605, respectively disposed on different surfaces of the computer device 1600 or designed in a foldable shape. In still some other arrangements, the display screen 1605 may be a flexible display screen, disposed on a curved surface or a folded surface of the computer device 1600. Further still, the display screen 1605 may be further set in a non-rectangular irregular pattern, e.g., a special-shaped screen. The display screen 1605 may be prepared by using a material such as a liquid crystal display (LCD) or an organic light-emitting diode (OLED).

A person skilled in the art may understand that, the structure shown in FIG. 16 is not limiting on structure or configuration of a computer device, and a computer device may include more or fewer components than those shown in the figure, or some components may be combined, or a different component deployment may be used.

According to one or more aspects, a non-transitory computer-readable storage medium including an instruction, for example, a memory including at least one computer instruction, is further provided, and the at least one computer instruction may be executed by a processor, to enable a computer device to perform all or some of operations performed by a terminal in the methods of FIG. 2 or FIG. 3. For example, the non-temporary computer-readable storage medium may be a read-only memory, a random access memory, a magnetic tape, a floppy disk, or an optical data storage device.

In some arrangements, a computer program product or a computer program may be further provided, the computer program product or the computer program including computer instructions, and the computer instructions being stored in a non-volatile computer-readable storage medium. A processor of a computer device may read the computer instructions from the non-volatile computer-readable storage medium, and the processor executes the computer instructions, to enable the computer device to perform all or some of operations performed by a terminal in the methods of FIG. 2 or FIG. 3.

This disclosure is intended to cover any variations, uses, or adaptive changes of this application. The variations, uses, or adaptive changes follow the general principles of this disclosure and include common general knowledge or common technical means in the art that are not described herein. The aspects described herein are merely exemplary.

Aspects described herein not limited to the precise structures described above or those shown in the accompanying drawings, and various modifications and changes can be made without departing from the scope of this disclosure.

What is claimed is:

1. A live streaming picture data processing method, performed by a computer device, the method comprising:

displaying a live streaming interface of a virtual scene, the virtual scene corresponding to live streaming pictures from n perspectives, where n is an integer greater than or equal to 2, and wherein the n perspectives comprise perspectives respectively corresponding to at least two virtual objects in the virtual scene;

obtaining live streaming picture data of a first perspective of the n perspectives;

displaying a live streaming picture from the first perspective and a split-screen control in the live streaming interface based on the live streaming picture data of the first perspective; and in response to receiving a trigger operation on the split-screen control:

obtaining live streaming picture data of m perspectives of the n perspectives; and performing split-screen display on live streaming pictures from the m perspectives in the live streaming interface based on the live streaming picture data of the m perspectives, where $2 \leq m \leq n$, and m is an integer;

obtaining a distance between a first virtual object and a second virtual object in the virtual scene, the first virtual object corresponding to a sixth perspective of the m perspectives, and the second virtual object corresponding to a seventh perspective of the m perspectives; and merging and displaying a live streaming picture from the sixth perspective and a live streaming picture from the seventh perspective in response to the distance between the first virtual object and the second virtual object in the virtual scene being less than a distance threshold.

2. The method according to claim 1, wherein the live streaming interface comprises m perspective switching controls, and the m perspective switching controls each respectively correspond to one of the m perspectives; and wherein the method further comprises:

obtaining live streaming picture data of a third perspective in response to receiving a trigger operation on a target perspective switching control, and switching a live streaming picture from a second perspective to a live streaming picture from the third perspective in the live streaming interface based on the live streaming picture data of the third perspective, the second perspective being any one of the m perspectives, the target perspective switching control being a perspective switching control corresponding to the second perspective in the m perspective switching controls, and the third perspective being any one of the n perspectives other than the m perspectives.

3. The method according to claim 2, wherein the obtaining live streaming picture data of a third perspective in response to receiving a trigger operation on a target perspective switching control, and switching a live streaming picture from a second perspective to a live streaming picture from the third perspective in the live streaming interface based on the live streaming picture data of the third perspective comprises:

displaying a first perspective selection interface in response to receiving the trigger operation on the target perspective switching control, the first perspective selection interface comprising n-m first selection controls, and the n-m first selection controls each respectively corresponding to one of the n-m third perspectives; and obtaining the live streaming picture data of the third perspective in response to receiving a trigger operation on a target selection control, and switching the live streaming picture from the second perspective to the live streaming picture from the third perspective in the live streaming interface based on the live streaming picture data of the third perspective, the target selection control being any one of the n-m first selection controls, and the live streaming picture from the third perspective being a live streaming picture from a third perspective corresponding to the target selection control.

4. The method according to claim 3, wherein the displaying a first perspective selection interface in response to receiving the trigger operation on the target perspective switching control comprises:

displaying the first perspective selection interface using a thumbnail map of the virtual scene as a background in response to receiving the trigger operation on the target perspective switching control;

obtaining positions of the n-m first selection controls in the thumbnail map; and displaying the n-m first selection controls in the first perspective selection interface based on the positions of the n-m first selection controls in the thumbnail map.

5. The method according to claim 4, wherein the obtaining positions of the n-m first selection controls in the thumbnail map comprises:

obtaining, for any first selection control, a position of the first selection control in the thumbnail map based on at least one of a responsibility of a virtual object corresponding to the first selection control in the virtual scene and a camp to which the virtual object belongs in the virtual scene.

6. The method according to claim 4, wherein the obtaining positions of the n-m first selection controls in the thumbnail map comprises:

obtaining, for any first selection control, a position of the first selection control in the thumbnail map based on a real-time position of a virtual object corresponding to the first selection control in the virtual scene.

7. The method according to claim 3, wherein when any first selection control corresponds to a virtual object, the first selection control comprises a character avatar or a user avatar of the virtual object corresponding to the first selection control.

8. The method according to claim 7, wherein the first perspective selection interface further comprises an avatar switching control, and the method further comprises:

for any first selection control, switching the character avatar of the virtual object corresponding to the first selection control to the user avatar, or switching the user avatar of the virtual object corresponding to the first selection control to the character avatar in response to receiving a trigger operation on the avatar switching control.

9. The method according to claim 1, wherein the method further comprises:

adjusting display sizes of the live streaming pictures from the m perspectives in response to receiving a split-screen size adjustment operation performed in the live streaming interface.

10. The method according to claim 9, wherein the m perspectives comprise a fourth perspective and a fifth perspective, and a live streaming picture from the fourth perspective and a live streaming picture from the fifth perspective correspond to size adjustment controls; and the adjusting display sizes of the live streaming pictures from the m perspectives in response to receiving a split-screen size adjustment operation performed in the live streaming interface comprises:

in response to receiving a drag operation on the size adjustment control, adjusting a display size of the live streaming picture from the fourth perspective and a display size of the live streaming picture from the fifth perspective based on a drag direction and a drag distance of the drag operation.

11. The method according to claim 1, wherein the obtaining live streaming picture data of m perspectives of the n perspectives in response to receiving a trigger operation on the split-screen control, and performing split-screen display on live streaming pictures from the m perspectives in the live streaming interface based on the live streaming picture data of the m perspectives comprises:

displaying a second perspective selection interface in response to receiving the trigger operation on the split-screen control, the second perspective selection interface comprising second selection controls respectively corresponding to the n perspectives;

obtaining the live streaming picture data of the m perspectives of the n perspectives based on a selection operation on second selection controls of the m perspectives of the n perspectives; and performing split-screen display on the live streaming pictures from the m perspectives in the live streaming interface based on the live streaming picture data of the m perspectives.

12. The method according to claim 1, wherein the obtaining live streaming picture data of m perspectives of the n perspectives in response to receiving a trigger operation on the split-screen control, and performing split-screen display on live streaming pictures from the m perspectives in the live streaming interface based on the live streaming picture data of the m perspectives comprises:

obtaining the live streaming picture data of the m perspectives of the n perspectives in response to receiving the trigger operation on the split-screen control; and performing split-screen display on live streaming pictures from m perspectives recently displayed in the live streaming interface of the live streaming pictures from the n perspectives in the live streaming interface based on the live streaming picture data of the m perspectives.

13. The method according to claim 1, wherein the obtaining live streaming picture data of m perspectives of the n perspectives in response to receiving a trigger operation on the split-screen control, and performing split-screen display on live streaming pictures from the m perspectives in the live streaming interface based on the live streaming picture data of the m perspectives comprises:

obtaining the live streaming picture data of the m perspectives of the n perspectives in response to receiving the trigger operation on the split-screen control; and performing split-screen display on live streaming pictures from the m perspectives of the n perspectives in the live streaming interface based on the live streaming picture data of the m perspectives, wherein the m perspectives are default perspectives of the n perspectives.

14. The method according to any claim 1, wherein the obtaining live streaming picture data of m perspectives of the n perspectives in response to receiving a trigger operation on the split-screen control, and performing split-screen display on live streaming pictures from the m perspectives in the live streaming interface based on the live streaming picture data of the m perspectives comprises:

determining quantities of viewers for the live streaming pictures from the n perspectives in response to receiving the trigger operation on the split-screen control;

arranging the n perspectives based on the quantities of viewers in descending order or in ascending order;

obtaining the live streaming picture data of the m perspectives of the n perspectives; and performing split-screen display on live streaming pictures from the m perspectives in the live streaming interface based on the live streaming picture data of the m perspectives, wherein the m perspectives are a first m perspectives of the n perspectives based on viewer quantity order.

15. The method according to claim 1, wherein the n perspectives further comprise a free perspective, and the free perspective is a perspective not bound to a virtual object in the virtual scene; and the merging and displaying a live streaming picture from the sixth perspective and a live streaming picture from the seventh perspective in response to the distance between the first virtual object and the second virtual object in the virtual scene being less than a distance threshold comprises:

obtaining live streaming picture data of the free perspective in response to the distance between the first virtual object and the second virtual object in the virtual scene being less than the distance threshold; and merging and displaying the live streaming picture from the sixth perspective and the live streaming picture from the seventh perspective as a live streaming picture from the free perspective based on the live streaming picture data of the free perspective, a perspective position of the free perspective being located at a midpoint of a connection line between the first virtual object and the second virtual object.

16. The method according to claim 1, wherein after the merging and displaying the live streaming picture from the sixth perspective and the live streaming picture from the seventh perspective, the method further comprises:

obtaining live streaming picture data of the sixth perspective and live streaming picture data of the seventh perspective in response to the distance between the first virtual object and the second virtual object in the virtual scene being greater than the distance threshold; and restoring split-screen display of the live streaming picture from the sixth perspective and the live streaming picture from the seventh perspective based on the live streaming picture data of the sixth perspective and the live streaming picture data of the seventh perspective.

17. The method according to claim 1, wherein after the performing split-screen display on live streaming pictures from the m perspectives in the live streaming interface, the method further comprises:

obtaining live streaming picture data of an eighth perspective in response to receiving an exit split-screen operation, and displaying a live streaming picture from the eighth perspective in the live streaming interface based on the live streaming picture data of the eighth perspective, the live streaming picture from the eighth perspective being a live streaming picture located at a specified position or a live streaming picture with a maximum display size in the live streaming pictures from the m perspectives.

18. A live streaming picture data processing apparatus, the apparatus comprising:

a processor; and memory storing computer-readable instructions that, when executed by the processor, cause the apparatus to:

display a live streaming interface of a virtual scene, the virtual scene corresponding to live streaming pictures from n perspectives, where n is an integer greater than or equal to 2, and wherein the n perspectives comprise perspectives respectively corresponding to at least two virtual objects in the virtual scene;

obtain live streaming picture data of a first perspective of the n perspectives;

display a live streaming picture from the first perspective and a split-screen control in the live streaming interface based on the live streaming picture data of the first perspective; and in response to receiving a trigger operation on the split-screen control:

obtain live streaming picture data of m perspectives of the n perspectives; and perform split-screen display on live streaming pictures from the m perspectives in the live streaming interface based on the live streaming picture data of the m perspectives, where 2≤m≤n, and m is an integer;

obtain a distance between a first virtual object and a second virtual object in the virtual scene, the first virtual object corresponding to a sixth perspective of the m perspectives, and the second virtual object corresponding to a seventh perspective of the m perspectives; and merge and display a live streaming picture from the sixth perspective and a live streaming picture from the seventh perspective in response to the distance between the first virtual object and the second virtual object in the virtual scene being less than a distance threshold.

19. A non-transitory computer-readable medium storing computer-readable that, when executed by a process of an apparatus, cause the apparatus to:

display a live streaming interface of a virtual scene, the virtual scene corresponding to live streaming pictures from n perspectives, where n is an integer greater than or equal to 2, and wherein the n perspectives comprise perspectives respectively corresponding to at least two virtual objects in the virtual scene;

obtain live streaming picture data of a first perspective of the n perspectives;

display a live streaming picture from the first perspective and a split-screen control in the live streaming interface based on the live streaming picture data of the first perspective; and in response to receiving a trigger operation on the split-screen control:

obtain live streaming picture data of m perspectives of the n perspectives; and perform split-screen display on live streaming pictures from the m perspectives in the live streaming interface based on the live streaming picture data of the m perspectives, where 2≤m≤n, and m is an integer;

obtain a distance between a first virtual object and a second virtual object in the virtual scene, the first virtual object corresponding to a sixth perspective of the m perspectives, and the second virtual object corresponding to a seventh perspective of the m perspectives; and merge and display a live streaming picture from the sixth perspective and a live streaming picture from the seventh perspective in response to the distance between the first virtual object and the second virtual object in the virtual scene being less than a distance threshold.

* * * * *